United States Patent [19]

Angst

[11] 4,214,391
[45] Jul. 29, 1980

[54] OPTICAL NUMERICAL SEGMENT DISPLAY

[75] Inventor: Walter Angst, Zumikon, Switzerland

[73] Assignee: Ackeret Design & Engineering, Ebmatingen, Switzerland

[21] Appl. No.: 877,221

[22] Filed: Feb. 13, 1978

[30] Foreign Application Priority Data

Feb. 18, 1977 [DE] Fed. Rep. of Germany ....... 2707081

[51] Int. Cl.$^2$ .......................................... G09F 13/18
[52] U.S. Cl. ...................................... 40/451; 40/546; 340/380
[58] Field of Search ................. 40/451, 452, 546, 547; 340/380; 350/96.1, 96.18, 96.19

[56] References Cited

U.S. PATENT DOCUMENTS

| 3,253,274 | 5/1966 | Berman | 40/451 X |
| 3,553,666 | 1/1971 | Melone | 340/380 X |
| 3,611,359 | 10/1971 | Panerai et al. | 340/380 |
| 3,858,341 | 1/1975 | Wakabayashi | 40/451 |
| 3,878,399 | 4/1975 | Higuchi et al. | 340/380 |

FOREIGN PATENT DOCUMENTS

| 1162237 | 1/1964 | Fed. Rep. of Germany . | |
| 1919798 | 2/1970 | Fed. Rep. of Germany . | |
| 2528574 | 1/1976 | Fed. Rep. of Germany . | |
| 1396236 | 6/1975 | United Kingdom | 340/373 |

*Primary Examiner*—John F. Pitrelli
*Attorney, Agent, or Firm*—H. Dale Palmatier

[57] ABSTRACT

An optical display presenting a display field at least one digit in a seven segment arrangement, a stack of seven plate elements for each digit and arranged in a stack, a single light source directing light into the light inlet ends of all of the seven plates, a movable shutter element wth transparent and opaque areas movable across the light source and light inlets of the plates, each plate having a chamfered edge portion remote from the light inlet end and reflecting light transversely of the plate and onto the display field.

55 Claims, 53 Drawing Figures

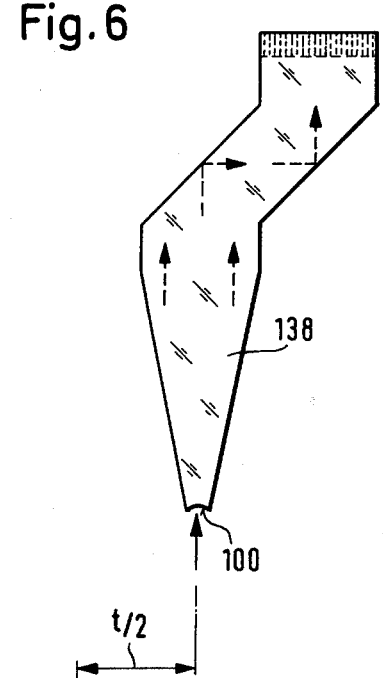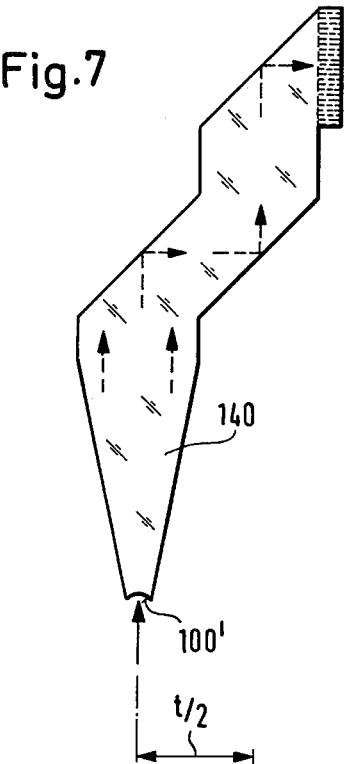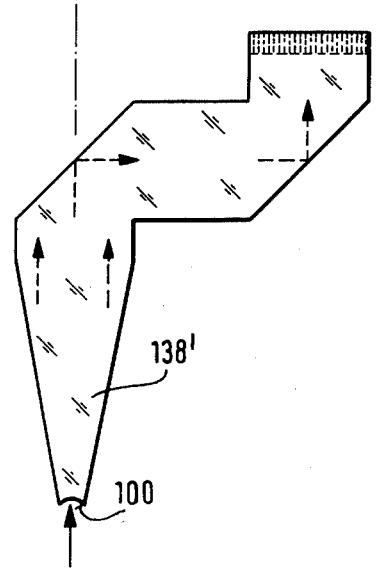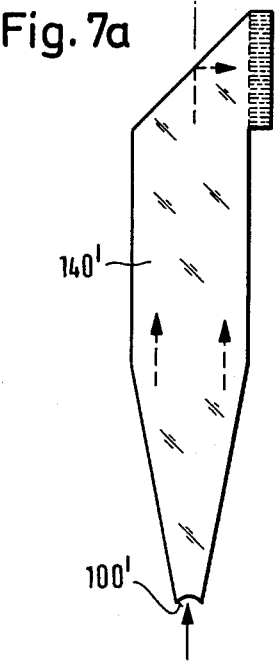

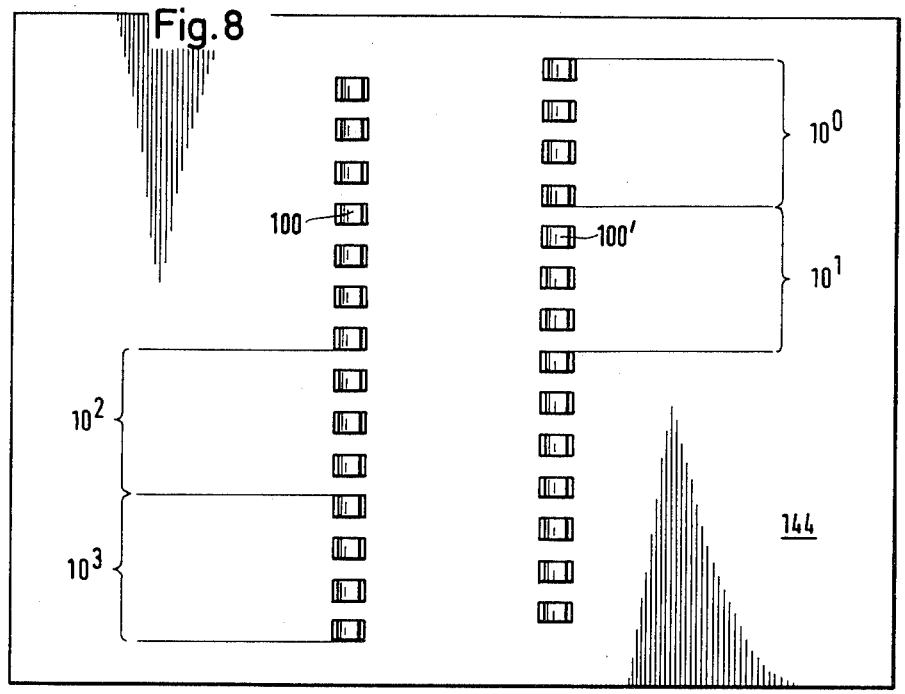
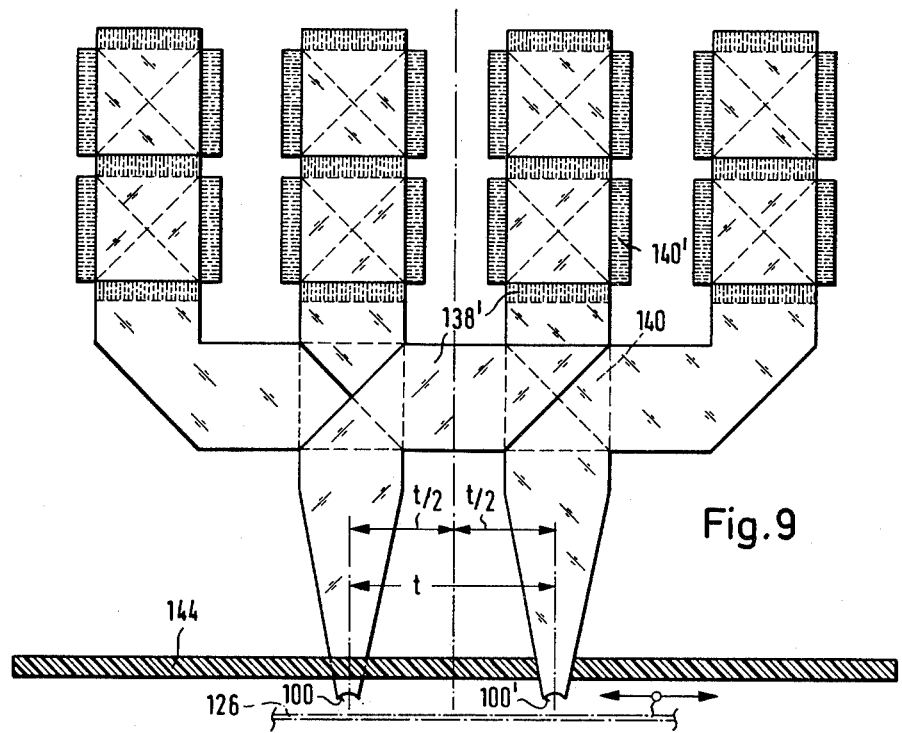

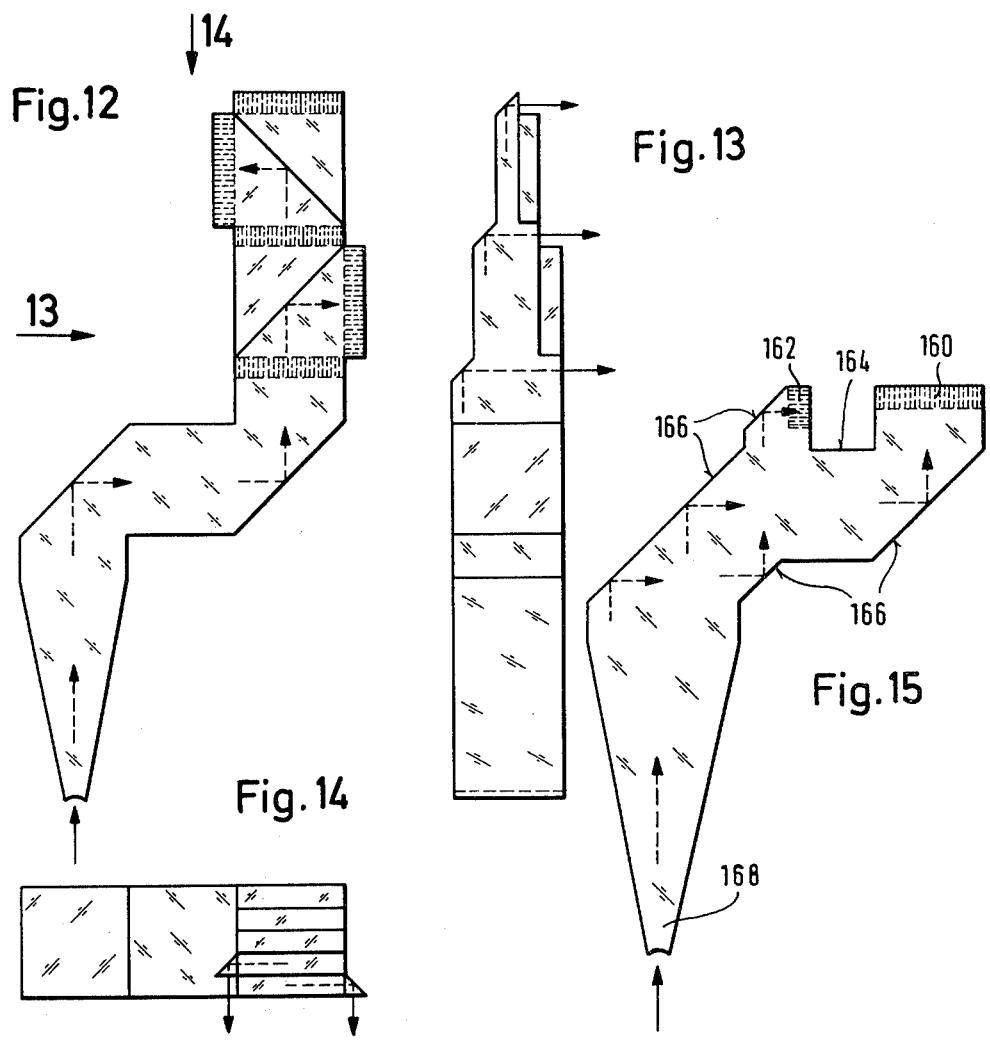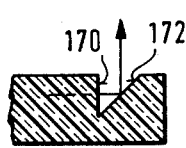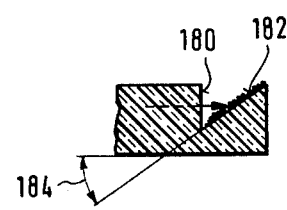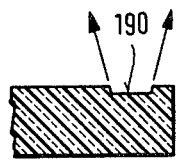

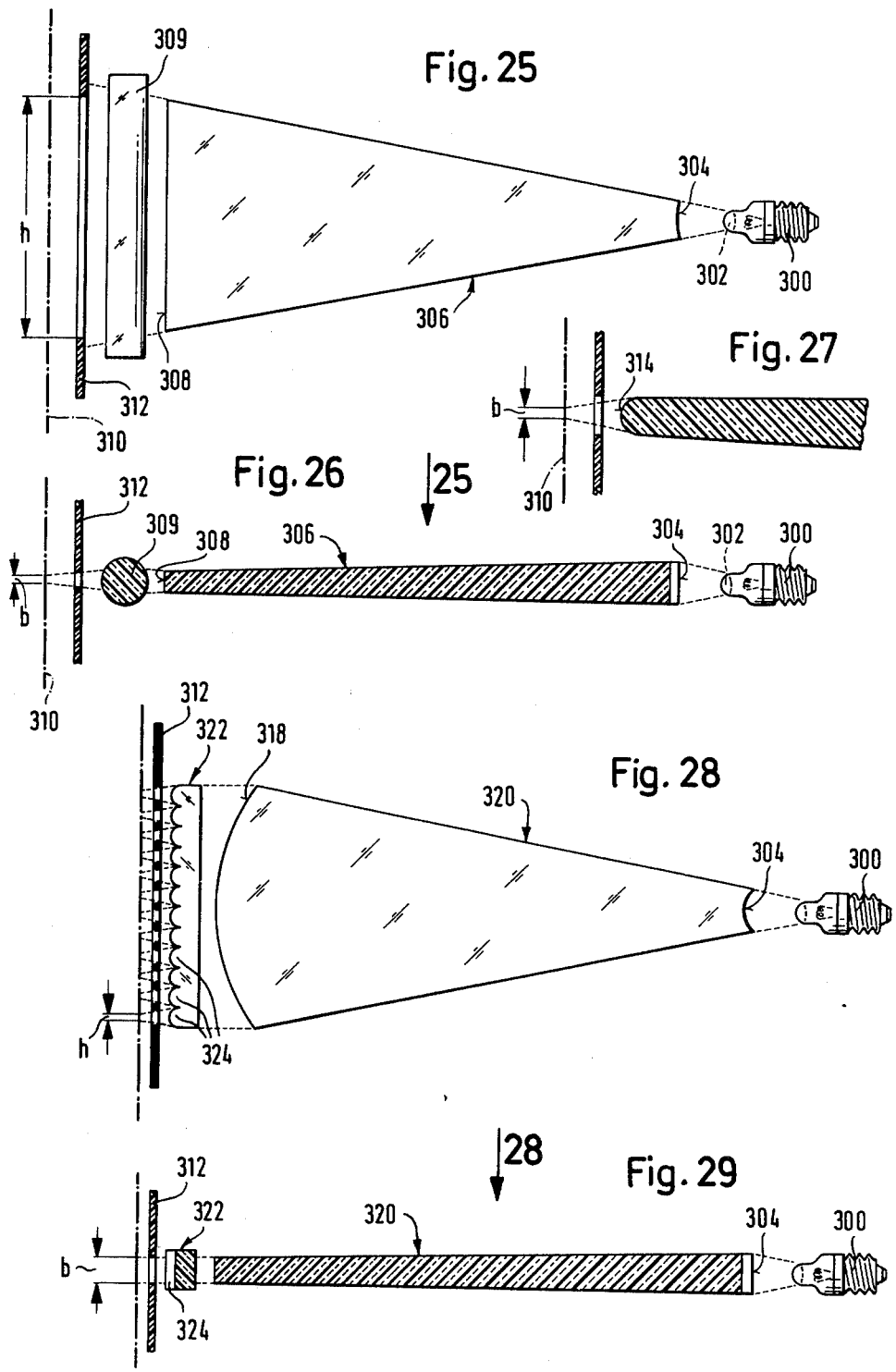

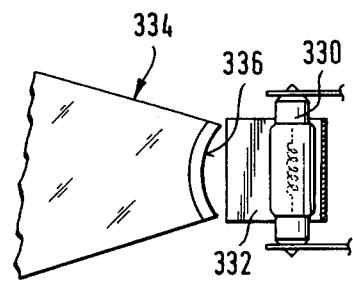
Fig. 31
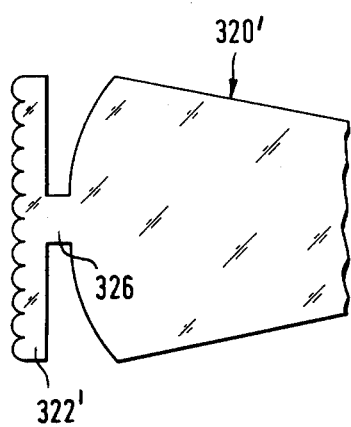
Fig. 30
Fig. 32
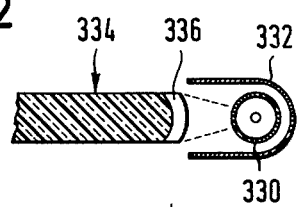
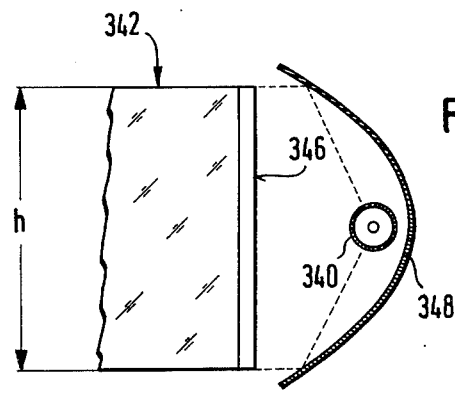
Fig. 33
Fig. 35
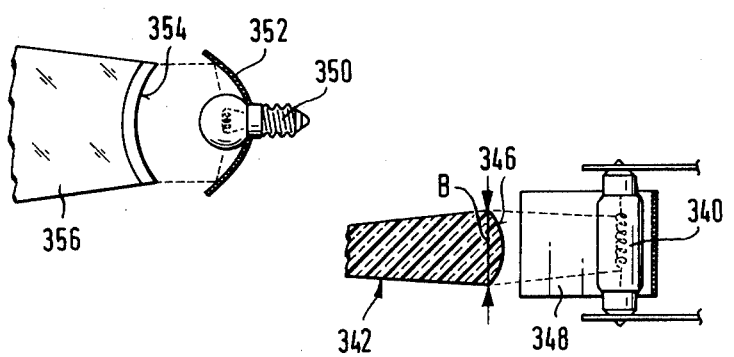
Fig. 34

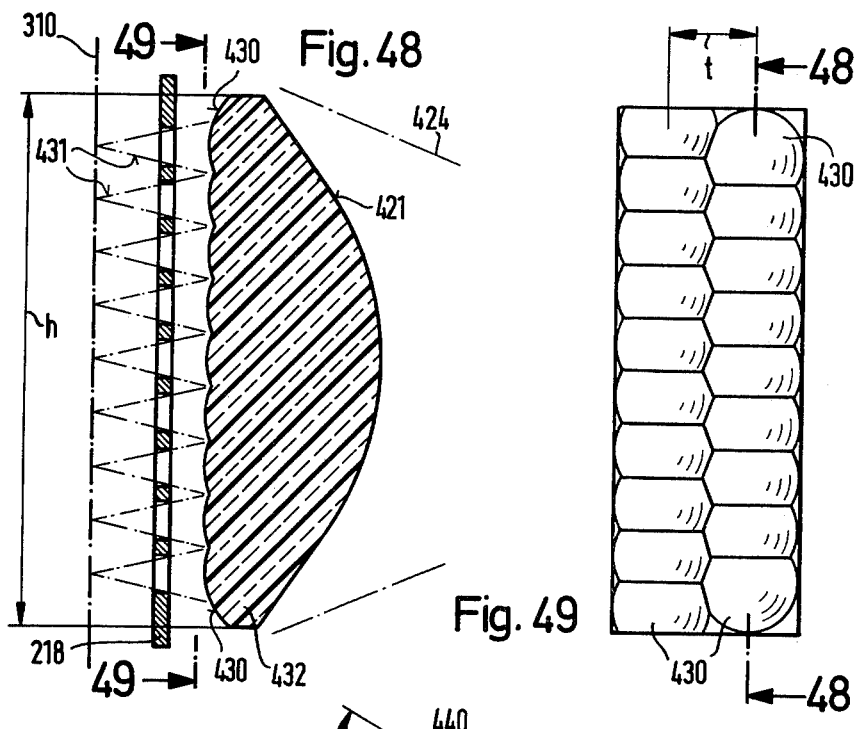
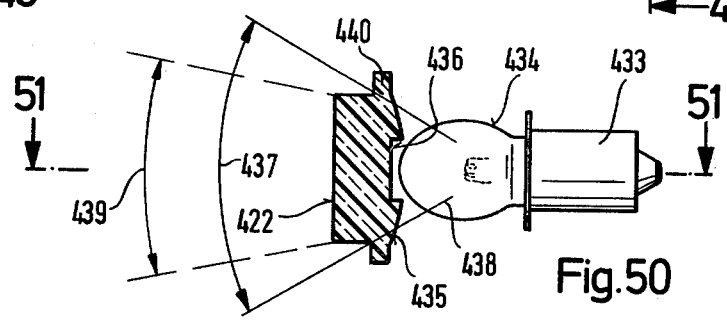
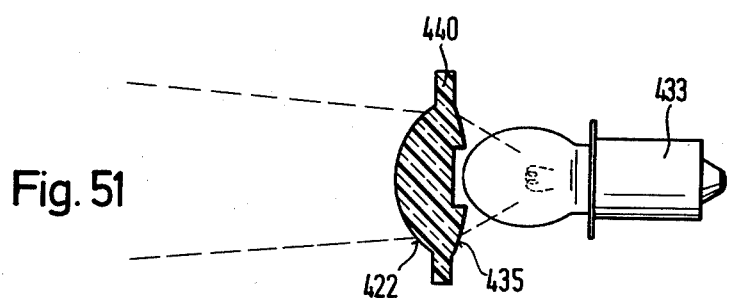

OPTICAL NUMERICAL SEGMENT DISPLAY

The invention refers to an optical numerical segment display.

BACKGROUND OF THE INVENTION

The principle of display of numbers by means of selectively illuminating a group of segments in a seven-segment-arrangement for each number is known for a long time. For example, each segment, frequently designated as a "bar", may be implemented by an electric lamp havng an elongated filament, power supply being selectively fed thereto.

Sometimes it is desired to control the segments not electrically but mechanically-optically, for example, by means of diaphragms which selectively enable or disable the light input into the segments. In such cases fiber optic light guides may be used, at one end of the guides for example, providing a small circular light input while at the other end the light guide is shaped in the desired bar form; thanks to the flexibility of the fiber optic light guides it is possible to dispose the diaphragm control for all seven segments in one straight line juxtaposed to each other. For a digitally displaying watch this is illustrated in West German Auslegeschrift (published specification) 19 19 798, FIG. 14 thereof.

Fiber optic light guides, however, are relatively expensive in particular for the display of numbers which are to be visualized over a greater distance and, thus, must have a correspondingly great size, and in particular the assembly of the flexible light guides results in complex manufacturing problems.

SUMMARY OF THE INVENTION

A device based on the light transmission in plate elements is disclosed and illustrated in West German Offenlegungsschrift (published specification) 25 28 574. Therein, each segment of a number is provided as the edge of a plate element extending perpendicularly to the display plane and having substantially triangular shape. One edge is the light output (i.e. a segment), the other one is the light input while the oblique edge serves as a reflecting plane.

Here the segment display is an integral member together with all light guides so that in this respect there is a sub-assembly relatively inexpensive to manufacture. However, for each light input an individual light source must be provided; one cannot see how one could combine this with the diaphragm control of one single light source.

Finally, there is a prior art optical alphanumerical display device wherein light transmitting plates lie in a pile and wherein each plate is provided with its own light source at one of its edges serving as the light input. The inventor points to the particular advantage that each plate displays a complete pattern (letter or number) upon illumination in that the individual patterns are engraved indentations visible according to the flood light principle. Since the plates lower-most in the pile are hardly recognizable due to the superposed plates with the engravement thereof the patterns are engraved as groups of dots or dashes. This concept is described and illustrated in West German Auslegeschrift (published specification) 11 62 237. Ten plate elements are necessary for each decade of the display which is a considerable drawback in particular for multi-digit numbers. Further, this concept involves the requirement that the light from the lower plates must pass through the upper ones and unless the light outputs are comprised of dots the individual numbers will interfere. In turn, numbers comprised of dashes and dots are difficult to recognize. Finally, it is desired that the display of all numbers will be possible in a common plane, a condition which cannot be met with this known design.

It is the object of the present invention to avoid the drawbacks mentioned above for the known displays and to provide an optical digital segment display comprising a light guide system consisting of plate elements having light outputs forming segments and having light source means for selectively radiating light into said plate elements wherein the light propagates along the plane thereof, wherein a light source of relatively small power and controlled by means of diaphragms is necessary to provide a relatively large display of even multi-digit numbers, said display being designed for manufacture and assembly with minimum expenses.

This problem is solved with the means defined in patent claim 1. It will be appreciated that each light guide in principle is a flat leaflet provided at the location of the segment with an oblique prismatic surface or with flood-light means. Since the light propagates in the leaflet due to total reflection and its exit occurs primarily perpendicularly to the plane of the plate and is, thus, employed for the display, even a very low power light source will suffice to illuminate relatively large segments with sufficient contrast. This is the more true as in contrast to the design disclosed by West German Auslegeschrift 11 62 237 wherein each light emitting segment is freely facing the display field and thus to the user; if desired by means of attached light guides the light emission may be provided in a plane common to all numbers without mutual superposition of the individual segments resulting in distortion. One single light source will suffice under these circumstances to illuminate all segments or bars of a multi-digit, for example four digit-display, and since all leaflets of all numbers are superposed the diaphragms of all ciphers, too, may be disposed in superposed arrangement and if desired on a common carrier, too.

A further important aspect will result therefrom. The light inlets of the plates may be made so small that the movements of the diaphragms may be made correspondingly small which will result in a generally small assembly wherein, however, the light source must be designed in such a manner that its light will reach as completely as possible the light inlets of the plates. The means provided for this purpose by the invention also involve inexpensive designs.

The advantages of the features cited therein will be discussed in detail hereunder, reference being made to the attached drawings which show embodiments of the invention.

Figure 1:
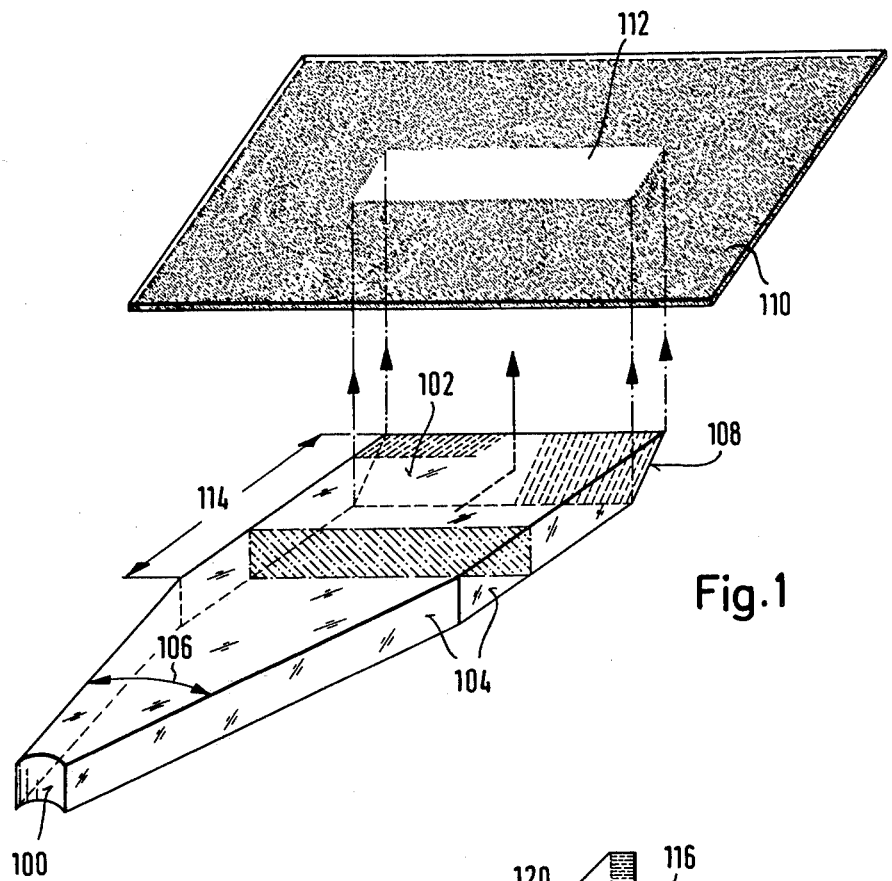
FIG. 1 shows a plate element of a first type in an isometric view.
Figure 3:
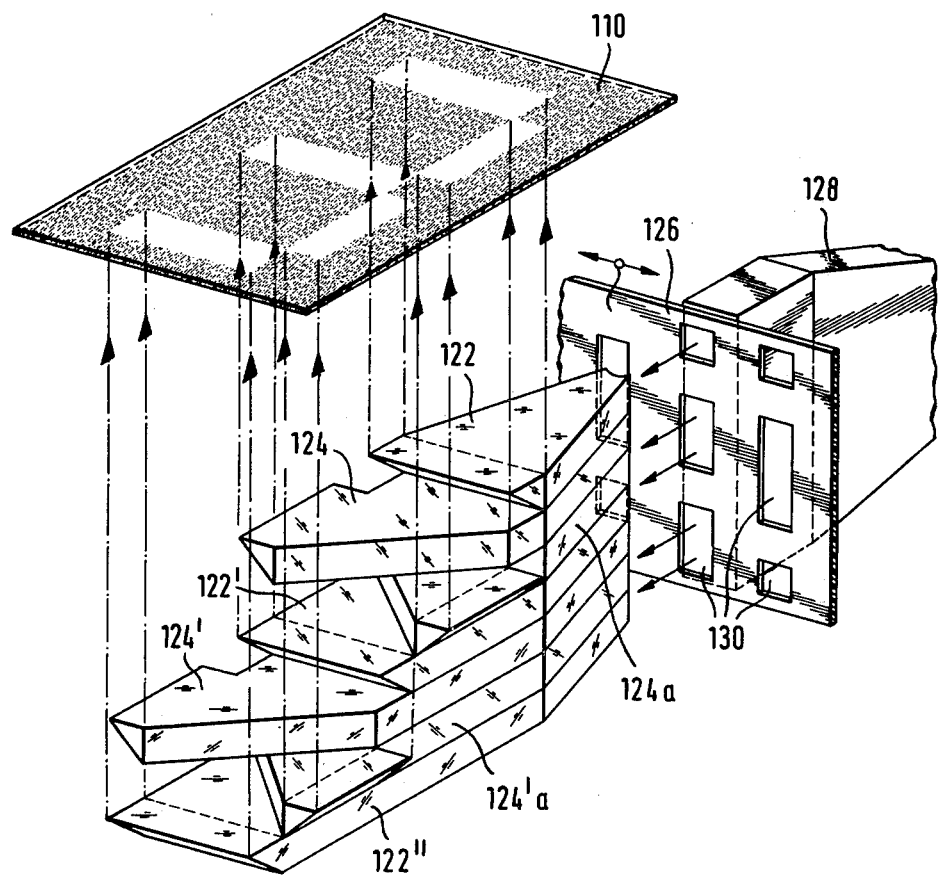
Figure 4:
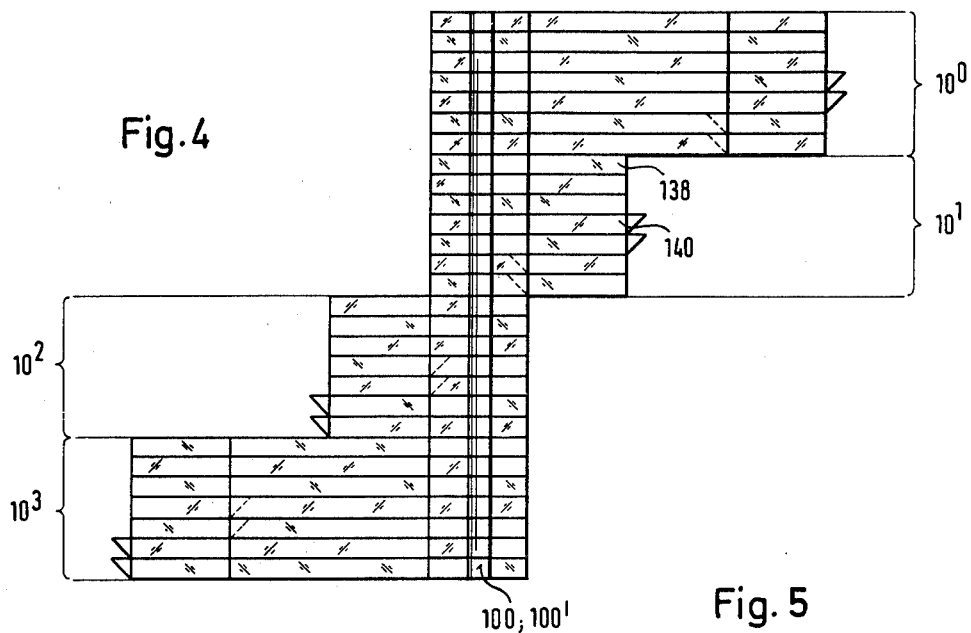
Figure 5:
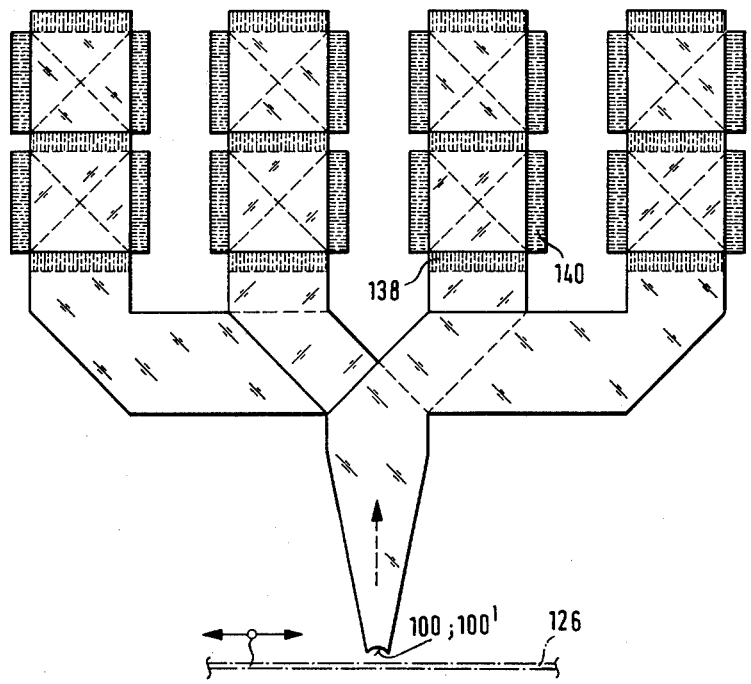
Figure 10:
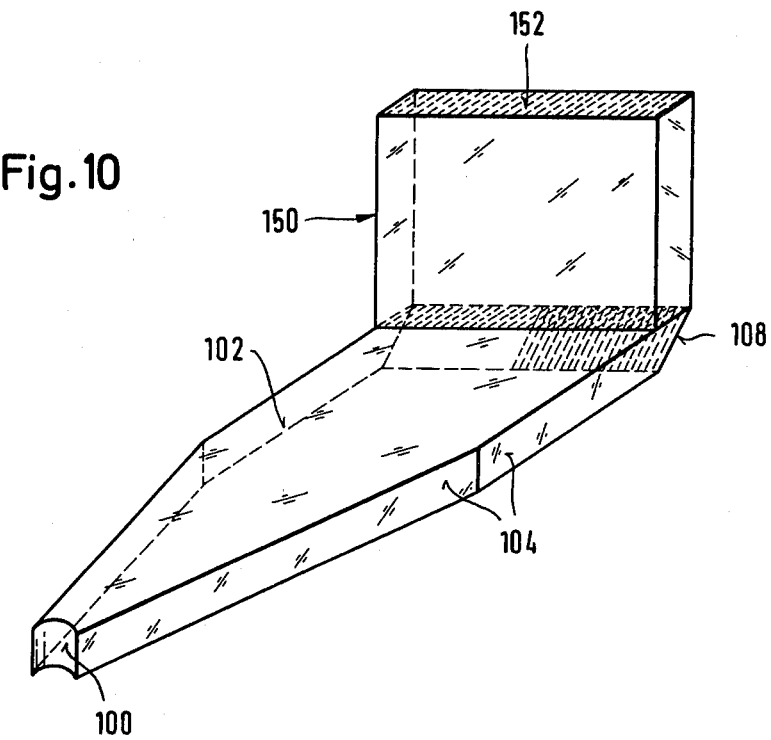
Figure 11:
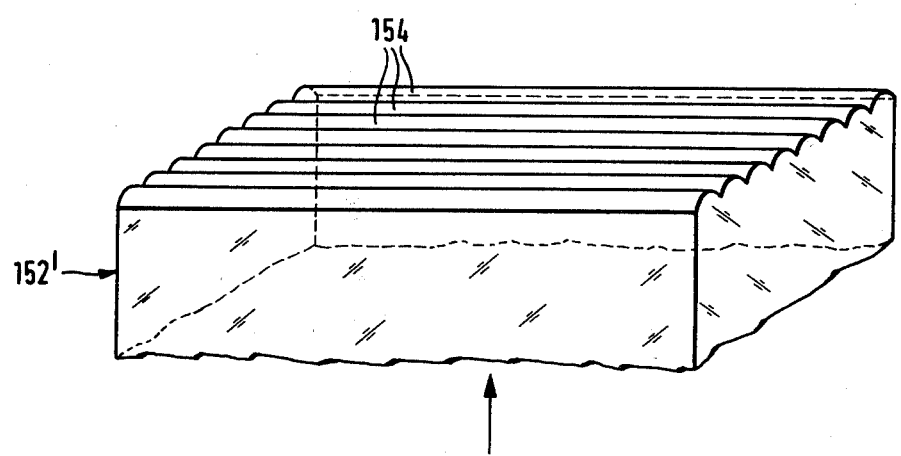
Figure 19:
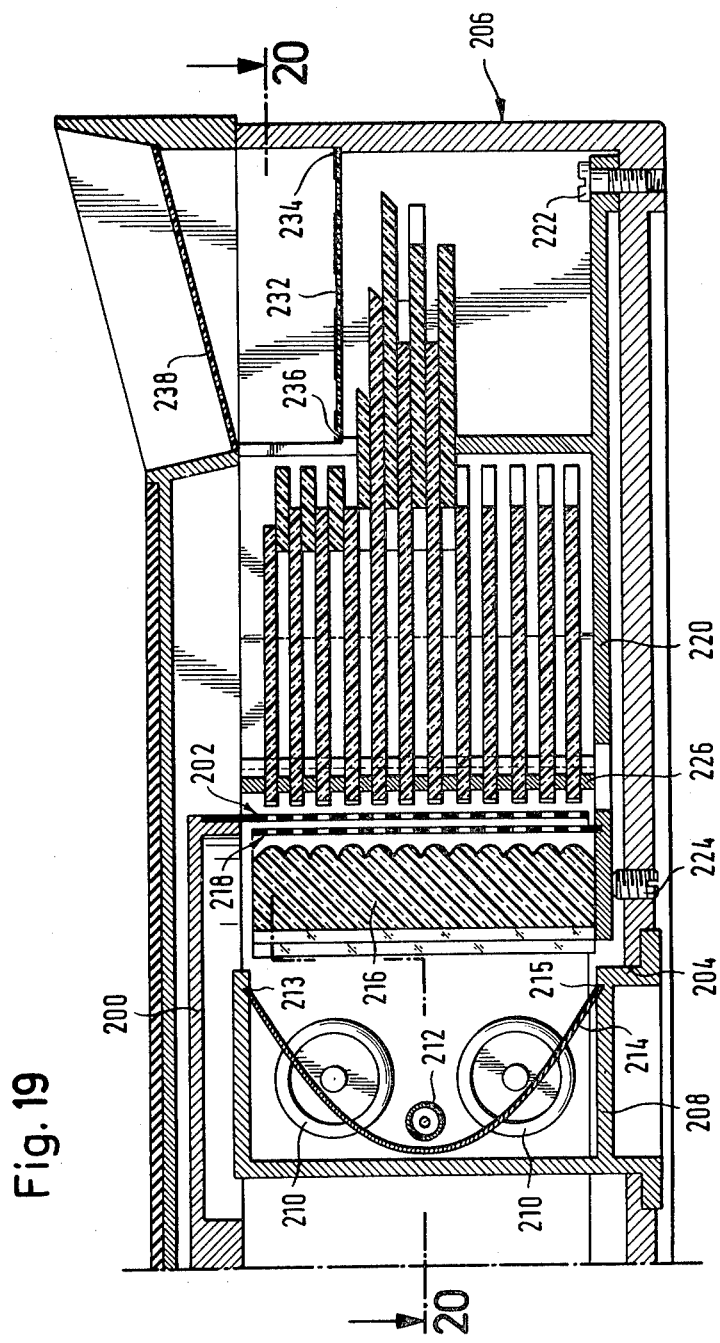
Figure 20:
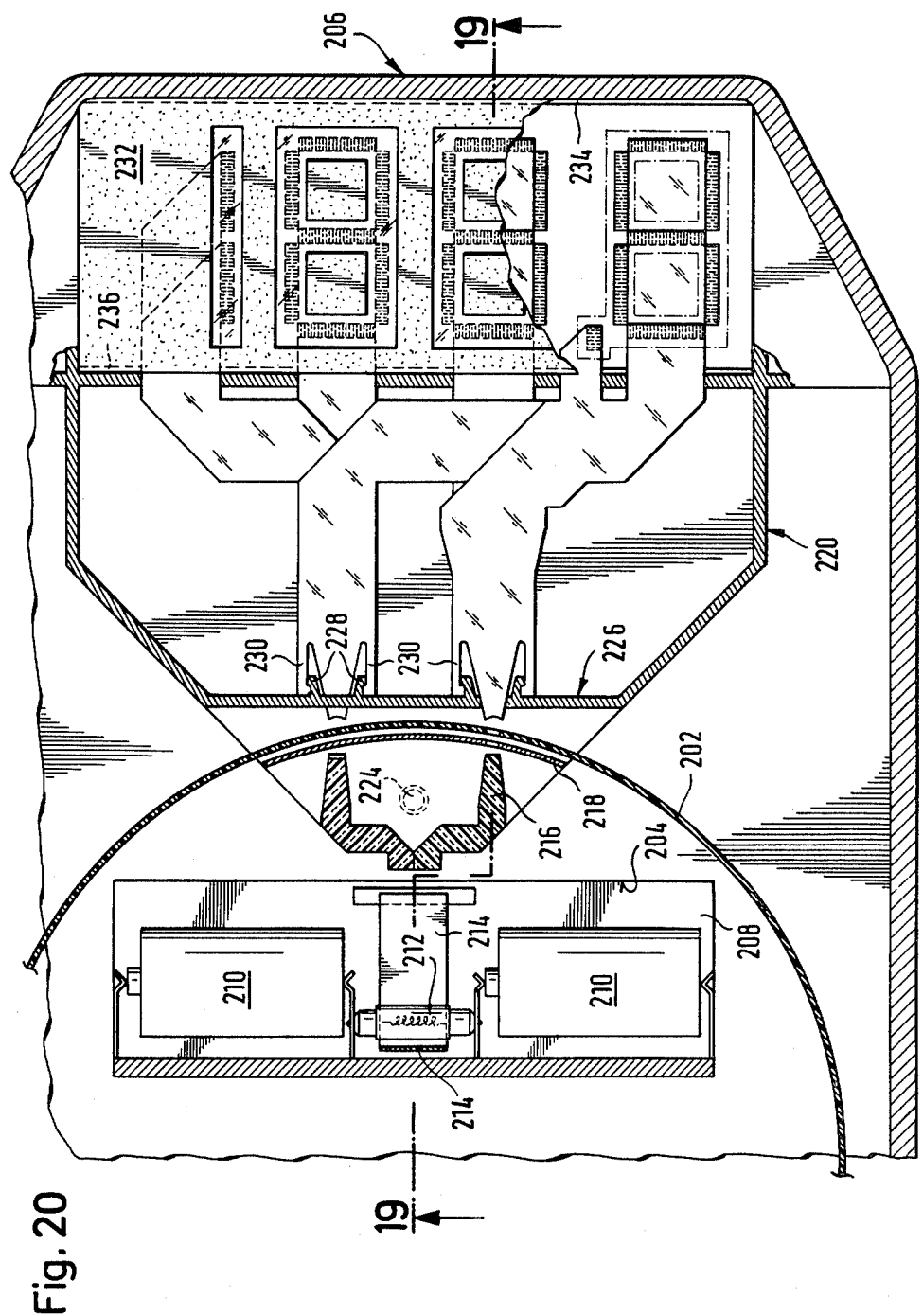
Figure 21:
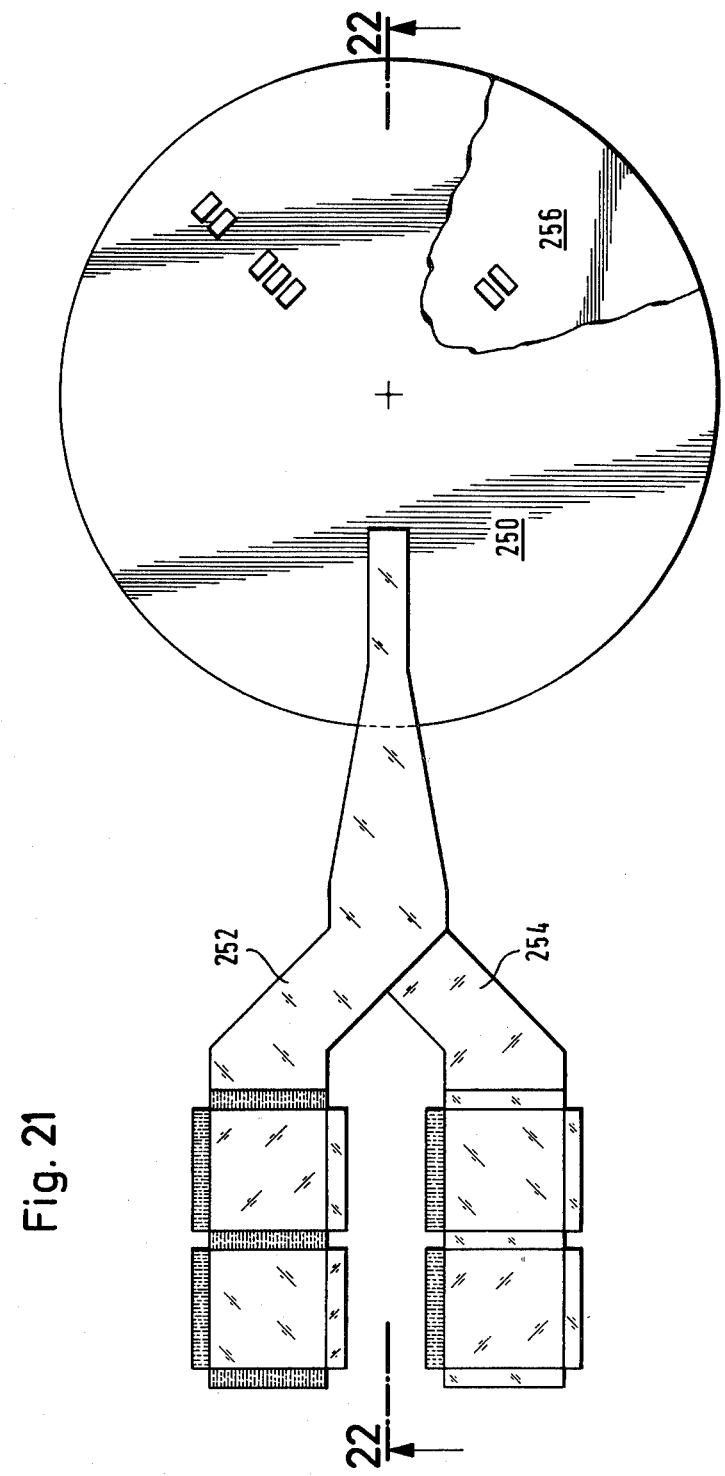
Figure 22:
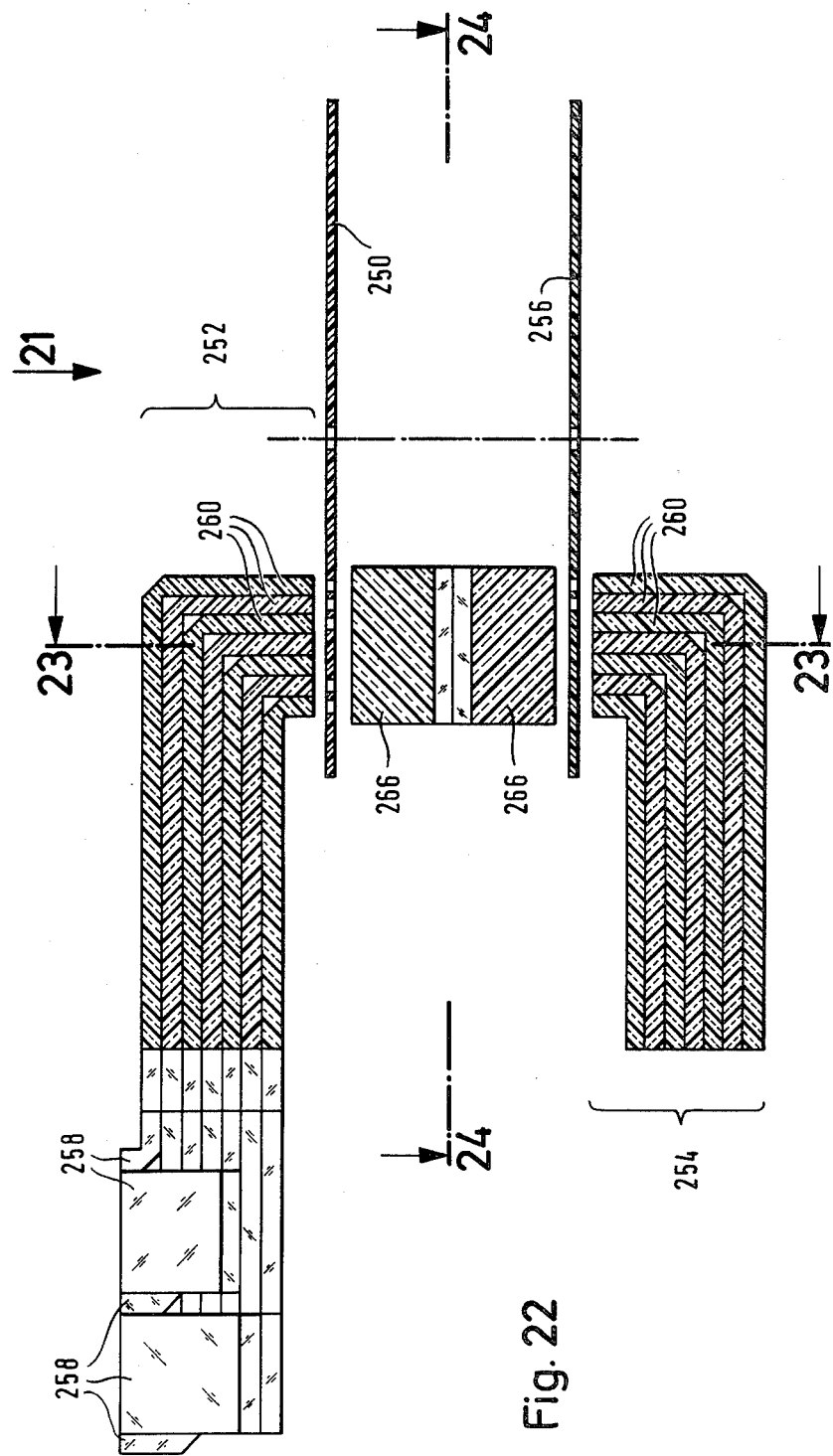
Figure 23:
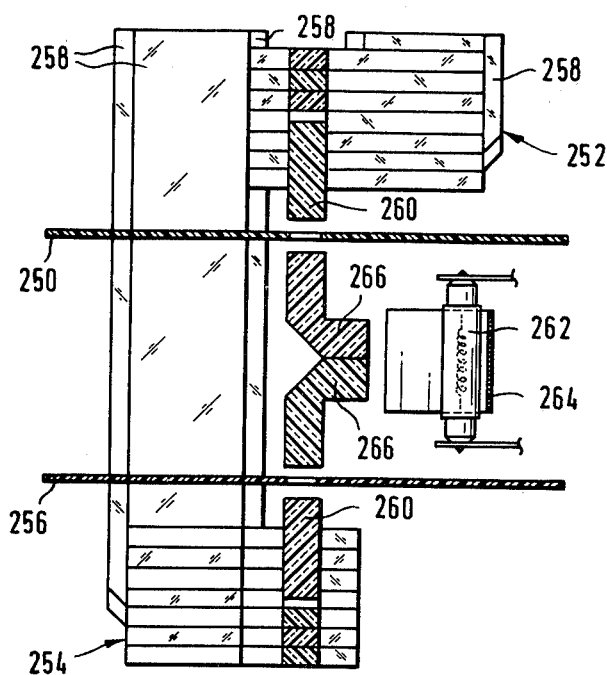
Figure 24:
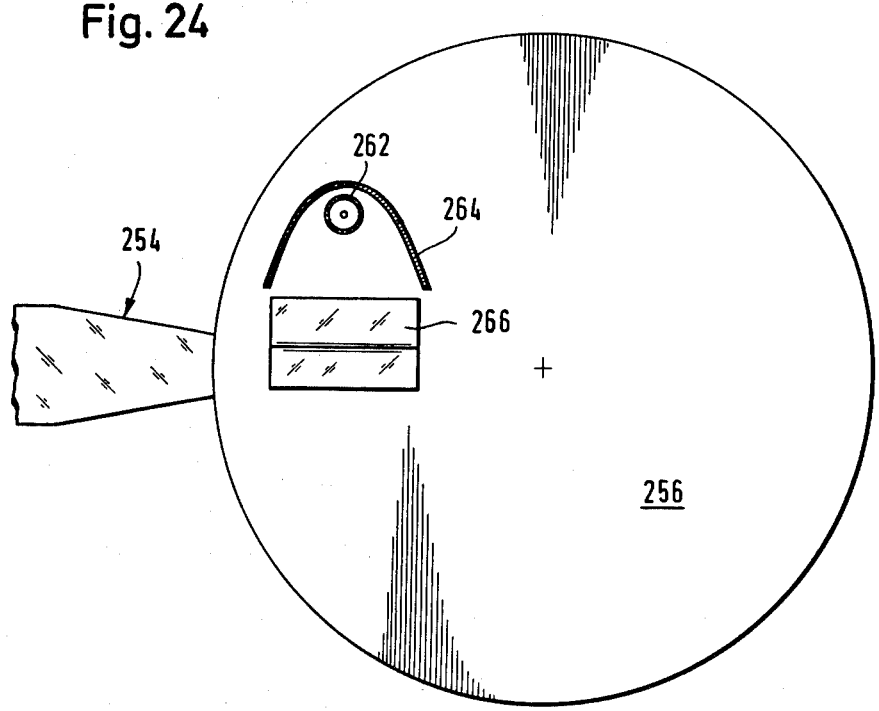
Figure 36:
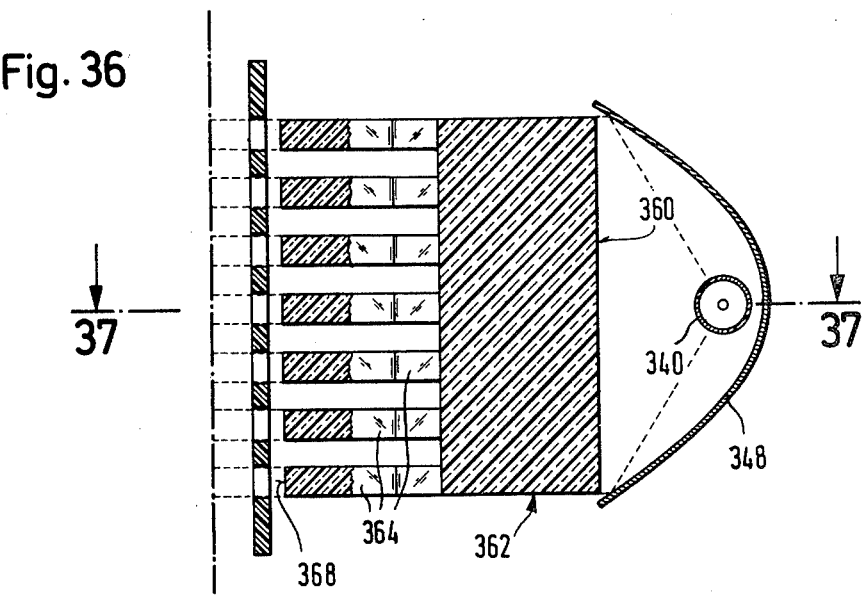
Figure 37:
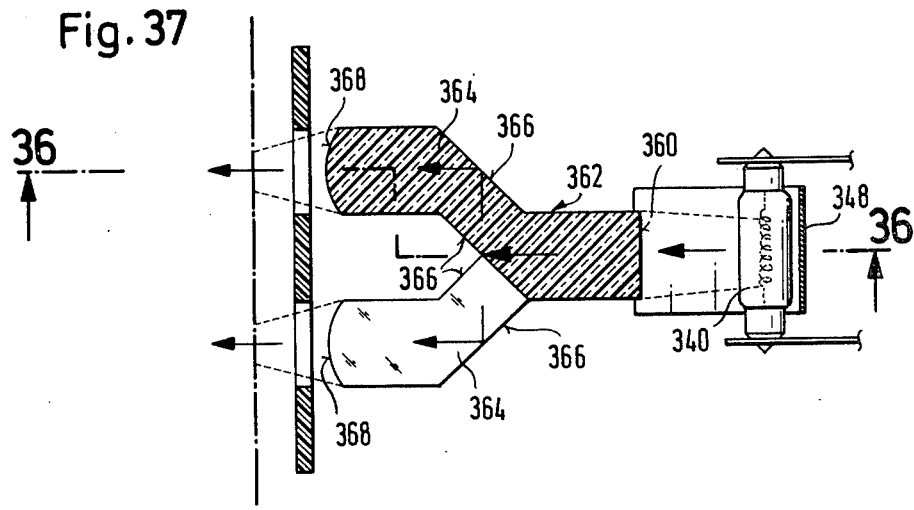

FIG. 3 is an isometric view of a complete plate pile combined with a code portion and a light source, FIGS. 4 and 5 are front elevation and plan view, respectively, of a first embodiment of a multi-digit display, FIGS. 6 and 7 are plan views of two plate elements of the assembly of FIGS. 4 and 5, FIGS. 6a and 7a, respectively, are plan views of plate elements comparable to those of FIGS. 6 and 7, respectively, of two corresponding plate elements of second embodiment of FIGS. 8 and 9, FIGS. 8 and 9, which show a second embodiment of a multi-digit display in an illustration analog to FIGS. 4 and 5, respectively, FIG. 10 shows a further embodiment of the plate element of FIG. 1, FIG. 11 is a partial view of the elements of FIG. 10 in an alternative embodiment, FIGS. 12-14 are plan view, lateral view and front view, respectively, of a combined plate element to display a certain number, FIG. 15 shows a plate element having an integrated half stop display, FIGS. 16-18 are sections perpendicularly to the light flux direction to show the light exits of alternative embodiments of the plate elements, FIG. 19 illustrates the essential parts of an example of an application in a section according to line 19—19 of FIG. 20, this section being made parallel to the view direction of the display, FIG. 20 is a section according to line 20—20 of FIG. 19, FIG. 21 is a schematic plan view of a further application example, FIG. 22 is a section according to line 22—22 of FIG. 21, FIG. 23 is a section according to line 23—23 of FIG. 22, FIG. 24 is a section according to line 24—24 of FIG. 22, FIGS. 25 and 26 are a plan view and an axial section view, respectively, of a first light source design, FIG. 27 is a detail section of an alternative embodiment of the light exit portion of the light transmitter of FIGS. 25, 26, FIGS. 28 and 29 are a top plan view and an axial section view, respectively, of a second light source design, FIG. 30 is a detail plan view of another alternative light exit portion of a light transmitter, FIGS. 31 and 32, detail plan and axial section views are, respectively, of a third light source device wherein another light source is used, FIGS. 33 and 34 are detail section views, on planes normal to each other, respectively, of another alternative light inlet portion, FIG. 35 is a detail plan view of the light inlet end of a fourth light source design, and FIGS. 36 and 37 are detail section views, respectively taken on lines 36—36 and 37—37, respectively, in FIGS. 37 and 36 showing another light source device well adapted for the embodiment shown in FIGS. 8 and 9.

Figure 38:
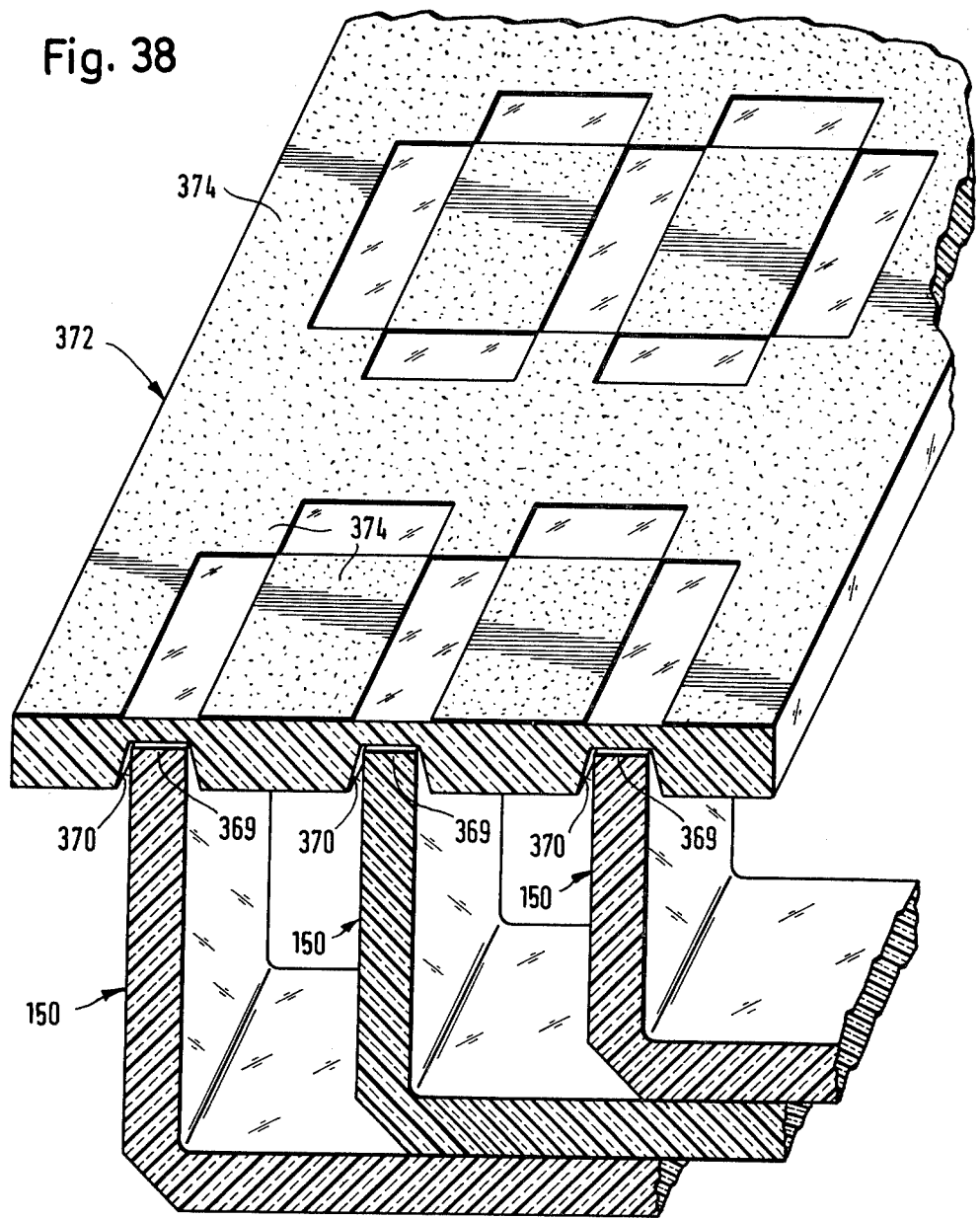
Figure 39:
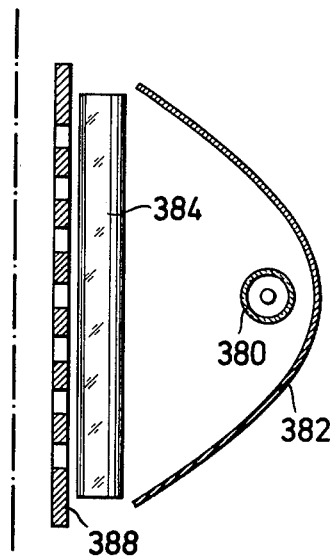
Figure 40:
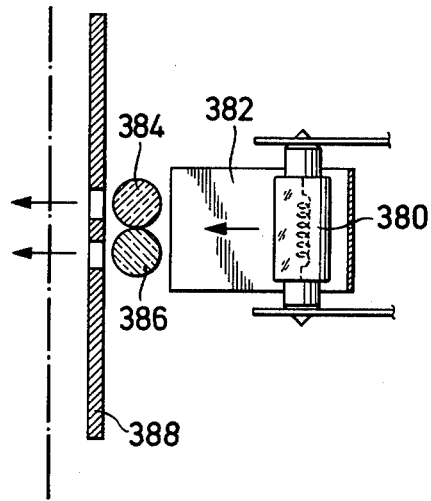
Figure 45:
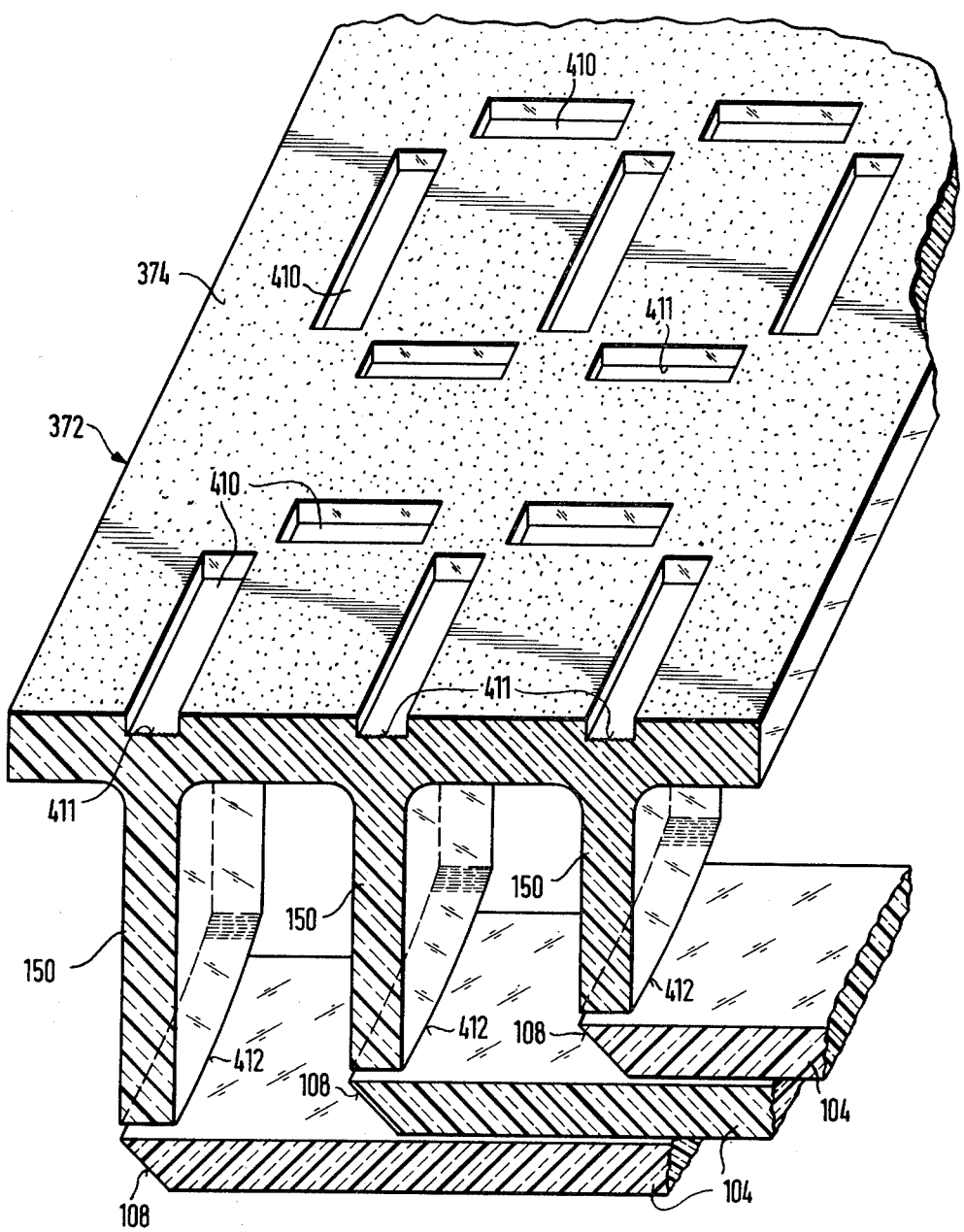
Figure 46:
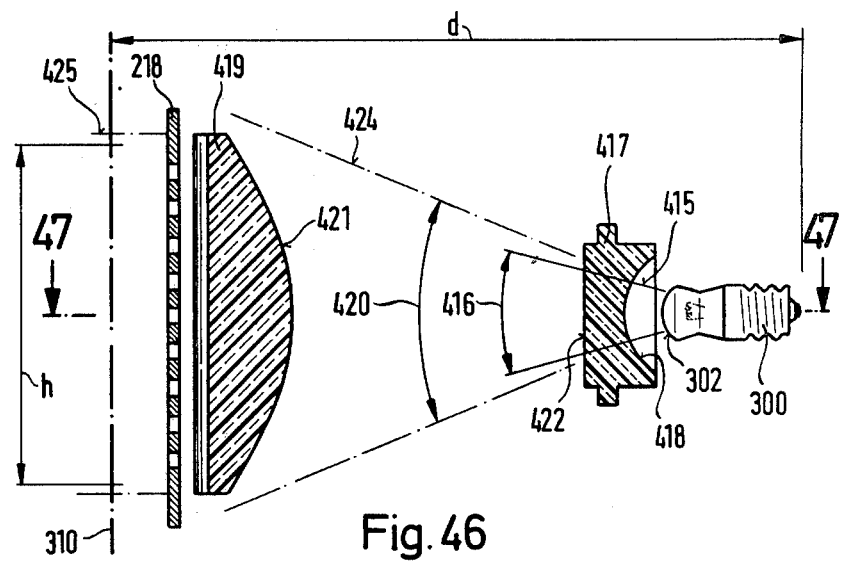
Figure 47:
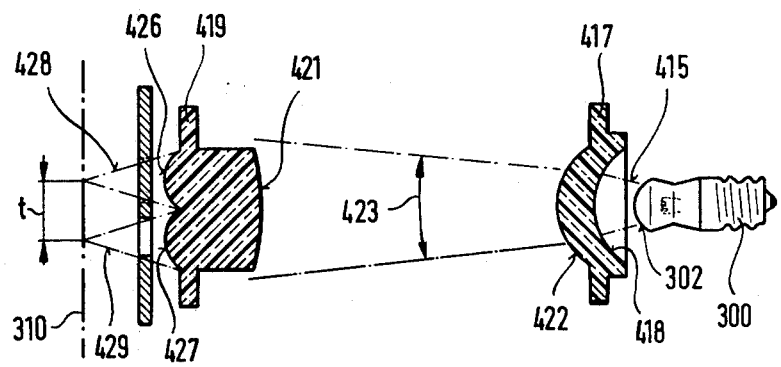

FIG. 38 shows isometrically, partly in section, a portion of a display screen including the block shaped light guides on the guide plates, FIGS. 39 and 40 are longitudinal and transverse section views, normal to each other, respectively, a further light source design and well adapted for the embodiment of FIGS. 8 and 9, FIGS. 41, 42 and 43 are plan views of alternate forms of light guide plates having more than one segment bar, FIG. 44 is a side elevation of any of the plate elements shown in FIGS. 41, 42 or 43, FIG. 45 is an isometric view of another form of display screen, and FIGS. 46 and 47 are detail section view on planes normal to each other, FIG. 47 being taken at 47—47 of FIG. 46, of another alternative light source, FIGS. 48 and 49 are detail section and elevation views, respectively, FIG. 48 taken at 48—48 of FIG. 49, and FIG. 49 being taken at 49—49 of FIG. 48, of an alternative lens of a light source.

FIGS. 50 and 51 are detail section views on planes normal to each other, respectively, FIG. 51 being taken at 51—51 of FIG. 50, of still another form of lens in the light source.

FIG. 1 illustrates a "basic element" or one individual light guide plate in its most simple shape. The plate is manufactured of a transparent eventually colored plastic material and integrally made preferably by injection molding. Such molds may be finished sufficiently accurately and smoothly that no finishing operation at the plate elements themselves will be necessary anymore.

The elongate plate comprises a light inlet surface 100 provided at one plate edge and concavely curved. The light is guided in a manner to be described later but is directed onto this inlet surface whose curvature results in divergency of the light. By far most of the individual light beams, however, will propagate, relative to the top and bottom surfaces 102 and to the lateral edges 104 of the plate, at angles suffuiciently small that the beams will be totally reflected at these optical interfaces. In general, therefore, reflective coating will not be necessary but this aspect will be discussed later. The total reflection is emphasized by the configuration of the elongate plate which from the light inlet surface 100 tapers outwardly with a wedge angle 106 preferably smaller than 30°.

At the end opposite to the light inlet surface 100 the plate is bevelled at 45° so that the light beams propagating within the plate will impinge upon this surface substantially at an angle of 45°, too, and will be reflected in direction to the upper cover surface 102 opposite the "prism surface" 108. Thus, on a display field 110 a bar 112 will be illuminated having a length equal to the length of the prism surface and a width equal to the thickness of the plate provided that the display field is parallel to the plate; the bar will be correspondingly larger if as illustrated in FIG. 1 both are disposed inclined with respect to each other.

This bar 112 is a first segment of the seven-segment-display. A complete number comprises three segments of this type which are parallel to each other. The three segments or bars 112 are emitted from the prism surfaces 108 of three separate light guide plates of three different lengths. Each of the plates has a connecting portion with a different length 114 between the light inlet surface and the opposite prism surface 108. The differences in length 114 relate directly to the spacing between the parallel segments or bars 112 in the display field 110.

Figure 2:
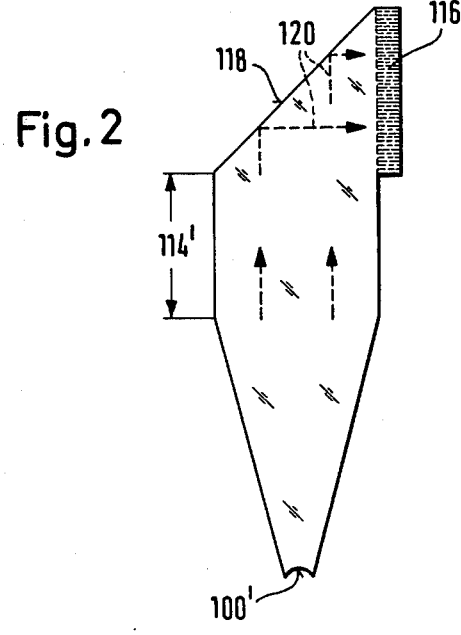
FIG. 2 is a plan view of a plate element of a second type.

The second basic type of plates is illustrated in plan view in FIG. 2. It distinguishes over the plate shown in FIG. 1 in that a light emitting area 116 in segment shape is provided laterally at one side, a prism edge again being provided thereunder. In order to have the light introduced at 100' reflected at said edge and emitted upwardly, the plate is formed at an angle of 45° so that the reflecting edge 118 so formed will bend the light beam, indicated by arrows 120. A complete number comprises the three first type plates of FIG. 1 mentioned above and two plates of the basic type of FIG. 2 which distinguished from each other by the length of their connecting portion 114'. The remaining two segments are provided by plates of the second type which, however, are mirror-symmetrical to the design shown in FIG. 2 so that the light emission area seen from the light inlet 100' will not be "right hand" but "left hand".

FIG. 3 shows the device for the display of one individual number, the pile consisting of seven plane plate elements with plates 122, 122' and 122" of the first type (FIG. 1) and the plates 124 and 124', 124a and 124'a of the second type (FIG. 2). The openings are arranged in strips in the plate 126, which strips are arranged perpendicularly of the direction of movement of the plate 126 as indicated by the arrow. Incremental movement of the plate 126 brings the code strips of openings 130 sequentially between the light source 128 and the light inlets of the plates. The plate 122' is longer than the plate 122 by the length of a light emitting area 116 of a plate of the second type and the same applies to the length ratio of plates 122' and plates 122". In a similar manner the plates 124'a and 124a respectively, is longer than the plate 124 and the plate 124a, respectively, by the length of one segment 116 plus the width of one segment or bar 112 (equal to the plate thickness). The plate 124 corresponds to the illustration of FIG. 2 while plate 124a is mirror-symetrical to the latter and the same applies to the plates 124' and 124'a, respectively.

The piling up is made in such a manner that seen from the display field 110 the longest plate of the first type (FIG. 1) is the lowermost followed by the longest plates of the second type (FIG. 2) in arbitrary sequence, thereafter the plate of medium length of the first type, thereafter again an arbitrary sequence the two shorter plates of the second type and finally the uppermost plate will be the shortest plate of the first type. In result the light emitting areas of all plates are directly confronting the display field and the emitting light need not traverse a superposing plate.

For the purpose of rendering the illustration clearer in FIG. 3 the plate thickness is exaggeratedly shown as compared to the remaining dimensions. From the viewer the differences of the distances from the display field 110 to the light emitting areas of the several plates for producing the segments within a number are harldy recognizable and in no case confusing. As will be explained hereunder, however, designs are possible wherein all light emitting surfaces are in one common plane.

FIG. 3 includes a portion of a code plate 126 between the light inlet surfaces of the plates and a light source 128. The code plate acts as a diaphragm and may be moved by means of a mechanism not shown in the direction of the arrow and may be fixed in predetermined positions wherein "coded" diaphragm openings 130 are held opposite the light inlets of the plates. The position shown in FIG. 3 permits light passage to the plates 122, 124a, 122', 124'a and 122" so that on the display field the number "3" will appear. Upon movement to the left the diaphragm code for number "2" will appear, upon movement to the right the number "4" whose diaphragm openings, however, are almost covered in the drawing.

It will be appreciated that the diaphragm may be most simple if as preferred the light inlets of each plate belonging to one and the same number are alignedly superposed and in a surface substantially parallel to the diaphragm surface. Under these circumstances only one single light source will be necessary for the display of all numbers.

The principle of the reflecting edges as shown in FIG. 2 may be used to superpose the plates of all numbers, too, of a multi-digit display in an aligned stock. Such a display device consisting of four digits and, thus, comprising 28 plates is shown in front elevation in FIG. 4 and in plan view in FIG. 5. The plates in stacks $10^0$ to $10^3$ for the several digits are oriented from the uppermost to the lowermost. The configuration of the two plates 138 and 140 selected as examples is shown in FIGS. 6 and 7, respectively.

If the light inlet surfaces of all plates are aligned as illustrated in FIGS. 4 and 5 there is the danger that light which does not leave a diaphragm opening 130 as an exactly parallel beam aligned with the plate plane will reach as background light the two immediately adjacent plates. Tolerance considerations also must be made. For this reason in certain cases it is suitable to offset the light inlets 100 and 100' of alternate plates in the stack as seen in FIGS. 8 and 9 by the distance t. Also, the code strip will have the diaphragm openings corresponding offset as they relate to the various light guide plates. As compared to the locations of the light inlets 100, 100' in FIGS. 4 and 5, the locations of alternate light inlets in FIGS. 8 and 9 are shifted by the distance t/2. In FIGS. 6a and 7a, respectively, the resulting configurations for plates 138' and 140' are comparable to the plates 138, 140 for the embodiment of FIGS. 8 and 9 is shown. FIG. 9 shows a plan view comparable to FIG. 5. Schematically it is shown that under these circumstances all distal light inlet portions of wedge shape are inserted into openings of a mounting plate 144. The mounting plate may be integrally formed with high precision and the distal light inlet ends may if necessary be bent to cater for thickness tolerances when the system is assembled.

FIG. 10 shows a plate element with the basic shape of FIG. 1 wherein, however, an additional block shaped light guide member 150 is mounted glued or integrally formed at the light emitting surface so that in this design the light will emit at the upper distal edge 152 of said member. With such additional light guide members having correspondingly different heights the exit from the light guide into air may be brought for all plates of a complete digital display into one common plane so to obtain optimum contrast. Instead of a plane light emitting surface shown in FIG. 10 this surface may be provided with convex ribs 154 extending longitudinally of the edge so to further reduce the divergency. An end of a light guide member 152' so designed is shown in FIG. 11 with a slightly increased scale with respect to FIG. 10.

In general the display device will be used to digitally display analog measuring values. In certain cases it may be desired to display the least significant digit in steps of just half a decade so that at this digit the display will alternate between "5" and "Zero". The zero, however, may be eliminated in certain situations.

FIGS. 12 to 14 show one single plate element by means of which the complete number "5" may be displayed. It may be understood to function as five individual plates in the configuration discussed above—such as plates 122, 124, 122', 124'a and 122" according to FIG. 3, since the respective bars, however, must radiate and remain dark, respectively, always simultaneously there is just one single light inlet necessary and consequently the plate element may be molded integrally with the necessary reflection surfaces.

FIG. 15 illustrates a plate element wherein together with bar or emitting area 160, a decimal point or half stop is provided by a shorter emitting area 162. Two features are of importance. On the one hand the plate is provided with an indentation or notch 164 separating the bar area 160 from decimal point area 164; as indicated by "light arrows" the respective prism surfaces are oriented perpendicular to each other and are illuminated from orthogonal directions, thus, having different position in the space. On the other hand the length of the reflecting edges 166 which guide the light partly into bar 160, partly into decimal point 162 are dimensioned such that under the assumption of uniform light rays in the light inlet portion 168 the display will be also illuminated uniformly.

FIGS. 16 to 18 illustrate three further possibilities how the light exit may be obtained substantially orthogonally to the plate plane. Already at this point it may be mentioned, however, that the design of the light exit discussed so far with a prism edge under the desired position will provide the optimum results.

In the embodiment of FIG. 16 again a prism is provided. The light passing along the arrow direction, however, will leave at first at the incision of the edge 170 which extends substantially perpendicularly to the light rays and will only thereafter impinge upon the outer face of the prism or reflection surface 172 which extends at 45° to the plate plane and to the edge 170. It will be seen that a portion of the light cannot emit.

The same drawback is present in the embodiment of FIG. 17. Again a incision edge 180 extends orthogonally to the light rays. The emitting light, however, will not impinge upon a reflecting surface but upon an inclined surface 182 extending preferably at an angle 184 of less than 45° and provided with a coating of a fluorescent material eventually in combination with finely divided metal a transparent artifical resin coating being used as the carrier substance for example.

In the plate of FIG. 18 at the light emitting point just an indentation 190 is provided eventually it being sufficient to roughen this point sufficiently to eliminate light reflection. The divergency angle of the emitting light will in this case be greater than with a reflecting prism since, however, all light radiating outputs are directly confronting the display field as explained above and since the light for this reason will not be distorted by superposed plate elements in particular for small display units this so called flood light principle will suffice.

With reference to an application example, namely a bath scale, further aspects of the invention will be explained.

The portions of this scale which are important for the invention are shown in FIGS. 19 and 20.

A load upon a scale platform (not shown) against the force of a resetting prism (not shown) results in a rotation of dish 200 the rotation being representative of the spring deformation. Code plate 202 having the shape of a cylinder wall is mounted upon the dish. By means of elements not shown preferably by means of a magnetic indexing system, the rotation of the dish is permitted, but in increments so that the code plate once the weighing system has ceased to oscillate, will always assume a position in which a code matrix will exactly face the light inlets of the display unit. The display comprises three digits before the decimal point and one digit behind the decimal point. Since, however, the display accuracy need be just 0.5 weight units (in general Kg) and the maximum value to be displayed will be 120 weight units instead of 28 plate elements there are just 23 elements necessary. The most significant digit will alternate but between zero and 1 and again the zero can be done away with and consequentyly just two plates will be necessary for the 1.

The piling and off-setting and thus the disposition of the individual code strips on the code plate 202 are chosen in accordance with FIGS. 8 and 9.

Into an opening 204 of the scale housing 206 from the bottom thereof a light source unit may be inserted consisting of a box 208 open in the direction of the plate light inlets and receiving four dry cell batteries 210 available on the market, a tubular lamp 212, a reflector 214 and the electric connections to and from the battery and the lamp. The reflector is simply a rectangular sheet metal strip clamped between two indentations 213, 215 of the box. Under these conditions the reflector will assume a parabolic configuration, with the filament of the lamp lying at the focus line. The major portion of the light, thus, will be directed as a parallel beam into the light inlet surfaces of the plates which are provided, however, with light dividers 216 to be described later. Between the light outlets of the light guides and the code plate there is provided an auxiliary diaphragm 218 which assures that no background light will distort the display. The plate pile, the auxiliary diaphragm and the light dividers are all mounted on a common support 220 fastened by means of screw 222 in the scale housing and adjustable in vertical direction relative to the code carrier by means of an adjustment screw 224. This support further comprises the mounting plate 226 with openings for the light inlet portions of the plates. As illustrated in FIG. 20 said mounting plate is provided laterally to each opening with hook-like protuberances 228 over which the compelementarily designed claws 230 of the plates will engage elastically.

Over each number field there is a mask 232 supported on the one end upon a step 234 of the scale housing and on the other edge by means of a step 236 of support 220. These masks are dark and provided with transparent gaps just in the range of the display bars so to improve the contrast. Inserted into housing 206 there is finally a transparent colored sight plate 238. It serves further improvement of the contrast since ambient light introduced from outside the scale must pass through this sight plate twice while the usuable light must traverse it just once.

FIGS. 21–24 show schematically a device comprising a two digit optical display wherein there is just one light source provided while nevertheless two code plates each one for each number are provided. The code plates may be moved synchronuously or independant of each other but always in indexing steps.

FIG. 21 illustrates the code plates 250 and the two plate piles 250 and 254 described in detail hereinabove; through the cut-off of the code plate 250 one will recognize the second code plate 250 coaxially thereunder.

The design of the light guide plates is shown in the sections of FIGS. 22 and 23, respectively. Each plate of the pile is provided with the light guide member 258 of the type illustrated in FIG. 10 or 11. Moreover, and in addition thereto at the light inlet side, too, such light guiding block 260 of similar design and for the similar purpose are provided. The light guide blocks 258 and 260 have different length for all plates such that all light inlet faces and outlet faces of each cipher are in common planes and that moreover all numbers, too, are in a common plane. The light of the single lamp 262 with reflector 264 of substantially parabolic section shape is divided by means of light dividers 266 uniformly to the two code plates.

Before the light dividers will be discussed in detail some remarks may be made with respect to possible alternative embodiments of the portions described so far.

Instead of the orthogonally disposed bars of each seven-segment-display the vertical bars may be disposed somewhat inclined and an expert having comprehended the discussion above will readily be able to provide the necessary alterations of the plates of the type shown in FIG. 2. For a multi-digit display the spacings between individual numbers may be identical or different.

In order to make the display recognizable even from greater distances the display field or the display disk 238, respectively, of FIG. 19 may be curved optically in the manner of a cylinder lens. Alternatively, the display field may be formed by a frosted glass thereby rendering the image somewhat more diffuse which, however, will not necessarily interfere with the clearness. Finally, the light outlet surfaces of the plates or of the light guiding blocks may be provided with the fluorescent or phosphorescent, coating in the latter case the light source need irradiate just for very short time to generate an image which will radiate for a sufficiently long time; it will be appreciated that the light source in the case of battery operation will be switched on just during the very measurement or even after the cessation of the oscillations of the measuring system.

If the device is safely protected against ambient conditions the superposing surfaces of the plates need not be coated with reflective materials. If, however, there is a danger that a medium having another refractive index will penetrate between the plates, for example condensated water, the total reflection had such a point will cease and the display will not operate properly anymore. For such applications the coating of at least one plate surface with reflective material is recommended, a metal film or the like being preferred.

Preferably fully transparent plastic material will be used for the plates but if desired individual plates or all plates of a certain digit may be colored in order to underlign an alarm signal or the like.

Above it has been mentioned that on the one hand the entire system is to be manufactured with a minimum of expenses and that on the other hand there is limited space for the system. With respect to the light source unit these requirements on the one hand involve the use of available low voltage lamps (battery supply) for illumination while on the other hand and because of the small available space and in order to provide a low load for the power supply the light as generated should be used as completely as possible but on the other hand in such a manner that nevertheless a precise irradiation of the individual light inlet surfaces will be possible even if these are spacedly off-set as shown in FIGS. 8 and 9. In order to meet these requirements an aspect of the invention involves light guiding elements in combination with the (single) light bulb. These light guides will be designated for reasons to explain hereunder as light transmitters or light dividers so as to distinguish them from the display plates discussed above.

The basic principle is illustrated in FIGS. 25 and 26. The light bulb 300 used therein comprises an integrated collection lens 302 in the glass bulb light emitting therefrom with a small divergency. In this direction there is the concave light inlet surface 304 of transmitter 306 which has the purpose to transform the light into a sharply limited beam of small divergency having a height h and a width b.

Again total reflection at the interfaces of a transparent plastic body is made use of. The transmitter 306, thus, tapers outwardly in wedge shape in direction h and tapers inwardly in direction b. The diverging light leaving it at the edge 308 opposite the light inlet 304 is collected again by means of a juxtaposed cylinder lens 309 preferably in such a manner that it converges somewhat in this plane, said lens 309 having a focus line disposed in any case beyond the light inlet surfaces 310 of the light guiding display plates. The code plate 312 extends between the cylinder lens and the light inlets of the display plates; the mask 218 of FIGS. 10, 20 is not shown for clarity purposes.

As illustrated in FIG. 27 the cylinder lens may be integral with the transmitter as a convex light outlet surface 314 thereof.

FIG. 28 shows an improvement for the case that instead of a rectangular opening in the code plate 312 with the dimensions h and b a multiplicity of superposed light inlets of display plates are to be illuminated. Instead of the one cylinder lens again a light outlet surface 318 of transmitter 320 is provided which has a convex curvature, however, with a curvature center line perpendicular to that of FIG. 27. In front thereof a light divider block 322 is mounted having a flat light inlet opposite the lens surface 318 and multiplicity of integrated cylinder lens 324 for each light guiding plate. FIG. 29 shows the section. In the center of transmitter 320 where the light is substantially parallel to the axis in accordance with FIG. 30 the transmitter 320 may be made integral with the light divider block 322' by means of an integral connecting piece 326 which may facilitate assembly and manufacture. Alternatively, the transmitter and the block may be glued to each other with a light transmitting glue.

At the light inlet end of the transmitter again alternative designs are possible permitting further cost savings and improvements. For example, the socket of a light bulb with integrated lens is more expensive than that of a tubular lamp, the latter further being more powerful and reliable. If a tubular light bulb is to be used the light inlet is to be designed as shown in FIGS. 31 and 32. The lamp 330 is combined with a reflector 332 in a similar manner as shown in FIGS. 19-24. The filament is parallel to the edges h. The transmitter 334 has a light inlet 336 concave in the plane of the filament and convex in the plane orthogonal thereto so that the desired collecting effect is obtained.

As illustrated in FIGS. 33 and 34 the filament of the tubular lamp 340 may also be disposed orthogonal with respect to the main plane of the transmitter 342, the length of the filament being about equal to the width b of the transmitter at the light inlet 342. The reflector 348 is correspondingly long and narrow; the inlet curvature of the transmitter effects the convergency in direction to the narrow light outlet.

FIG. 35 illustrates just schematically how by use of a low price bulb (pocket lamp bulb) 350 in combination with a reflector 352 the light inlet 354 of a transmitter 356 may be irradiated.

The several embodiments of the light inlets, light sources and light outlets may be arbitrarily combined as may be readily appreciated by an expert.

FIGS. 36 and 37 finally illustrate how by means of single integral light transmitter and divider systems the light inlets of off-setted piled display plates may be illuminated, the design of FIGS. 8 and 9 being used.

The light source corresponds to the design of FIGS. 33 and 34 in combination with a transducer outlet of FIG. 32. Beyond the light inlet 360 of transmitter 362 the latter is branched off to both sides so defining "branches" 364 of similar height, edges 366 being totally reflective. Each branch 364 forms its own cylinder lens 368 by means of which the light is convergingly directed to the light inlet of the respective display plate. Such a transmitter is an integral plastics injection molded member manufactured at low expenses. For the uniform illumination it is of advantage if the sum of the outlet sections is equal to the inlet section.

The principle of total reflection at 45° surfaces and/or edges may, of course, be used in any case where a light flux substantially parallel to the main plane may be assumed. In this manner the light can be guided by means of the transmitter, too, into arbitrary planes orthogonal to each other or even into planes parallel to each other as in the embodiment of FIGS. 21-24.

Under certain circumstances it is not even necessary to provide an individual light source. The appliance provided with the display system according to the invention may comprise an inlet for ambient light which is supplied to the light inlets of the display plates by means of light guides similar to the described transducers in combination with reflectors so to collect and direct the light.

The coated plates may be glued together by means of an optically isolating glue; the same applies to the light transmitters if they are manufactured as separate pieces for each branching plane, such individual portions being easier manufactured by injection molding. FIG. 38 shows isometrically partly cut away an embodiment of the mask (232 in FIG. 19) for a display with plates according to FIG. 10.

The light guides 150 are mounted with their light exits 369 in a complementary indentation 370 of mask 372. The mask with all its indentations is an integral member and serves the positioning of the light outlets. The mask 372 is made of transparent plastics material perhaps colored to improve the contrast. On one face preferably at the face opposite the viewer the mask field 374 is glued or printed upon the mask, thus leaving unmasked areas for the number segments.

Instead of the still somewhat complex design shown in FIGS. 36 and 37, the light source may be designed as shown in FIGS. 39 and 40. It comprises lamp 380, parabolic mirror or reflector 382 and, in front of the latter, two cylinder lens 384, 386 converging the light impinging thereon and dividing it into two beams having elongated shape. The light then passes through the openings of mask 388 unto the code strip.

With reference to FIGS. 12–15 it had been explained how a plate element having more than one exit area or prism surface may be designed. The plate element had one single light inlet having, however, a height corresponding to the sum of the light inlets necessary for each individual bar. Alternatively, the light inlets may be disposed side by side instead superposed if the code is commensurate with the display design of FIGS. 8 and 9.

Figure 41:
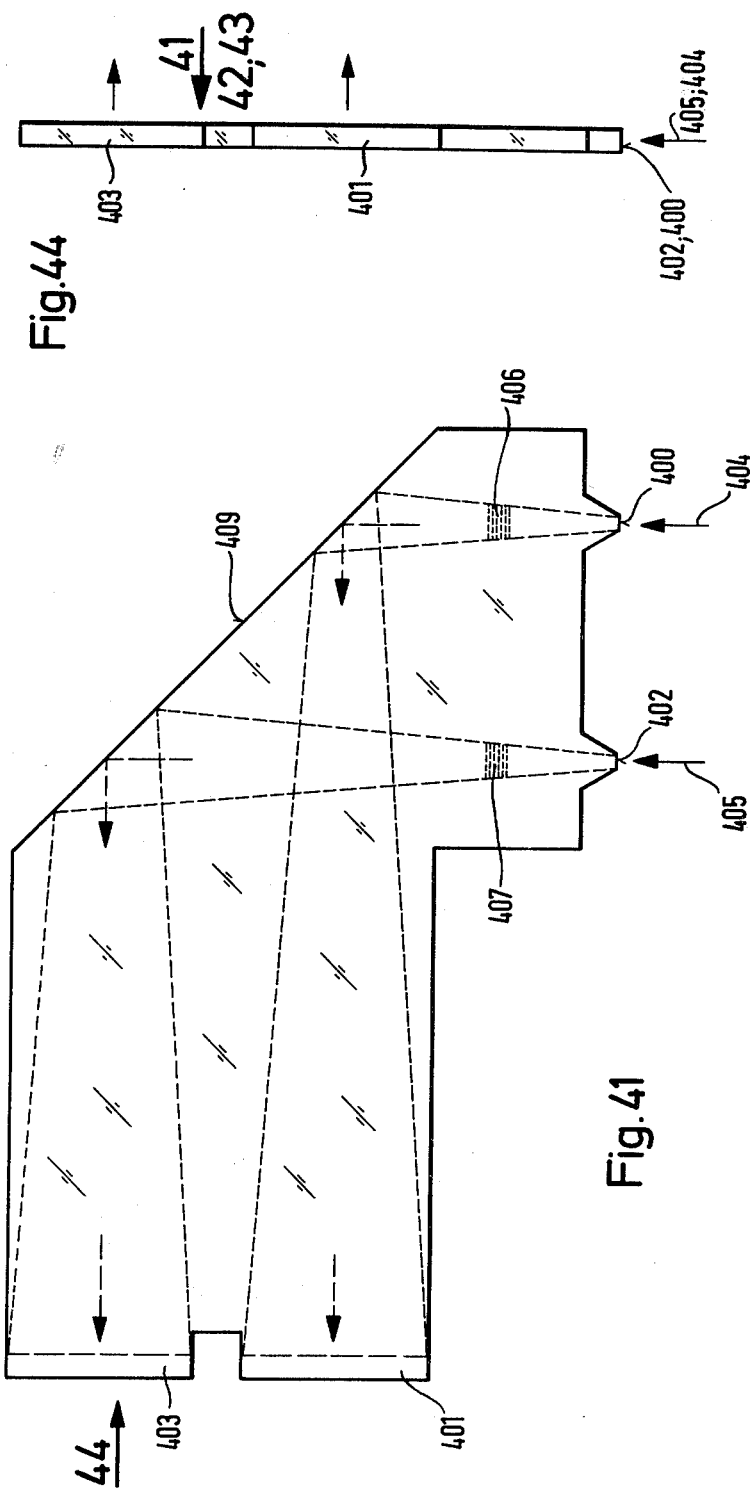

FIG. 41 shows such a plate element in plan view. The number "1" is to be displayed. In fact, this is a duplication of the plate element shown in FIG. 2.

Light inlet 400 belongs to segment 401 and light inlet 402 belongs to segment or bar 403. The light beams 404 and 405, respectively having sections 406 and 407 within the plate element, will be totally reflected—as in FIG. 2—at reflecting face 409.

Figure 42:
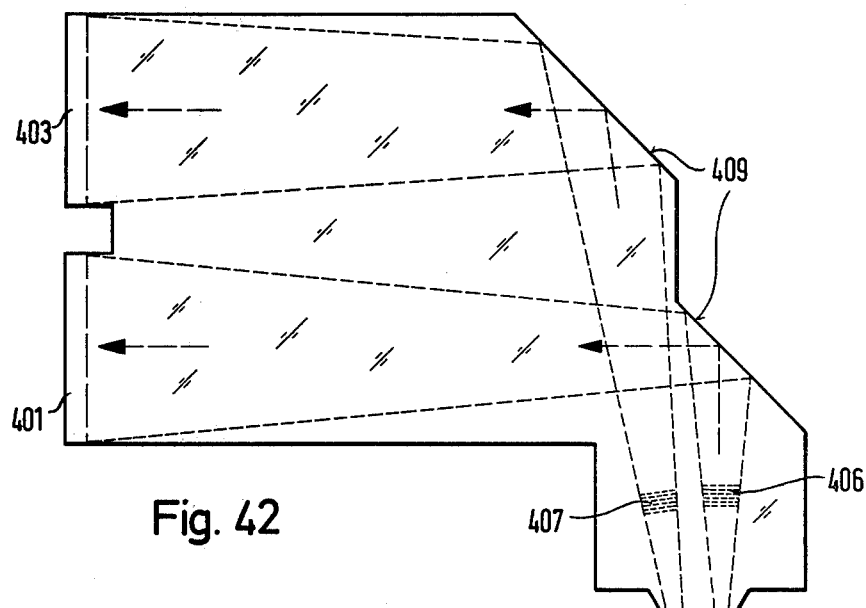

In practice, the lateral distance between light inlets 400 and 401, designated "t" in FIG. 9, will be rather small. In order to prevent partial overlapping of beam sections 406 and 407, one of the light inlets may be somewhat inclined. This is indicated in FIG. 42 wherein the angle 452 with beam axis 405 may be, say, 80°. The inclined face 409 is stepped accordingly.

As may be seen from FIG. 44, the thickness of such a plate element will be equal to that of an "elementary" element as shown in FIGS. 1 or 2.

Figure 43:
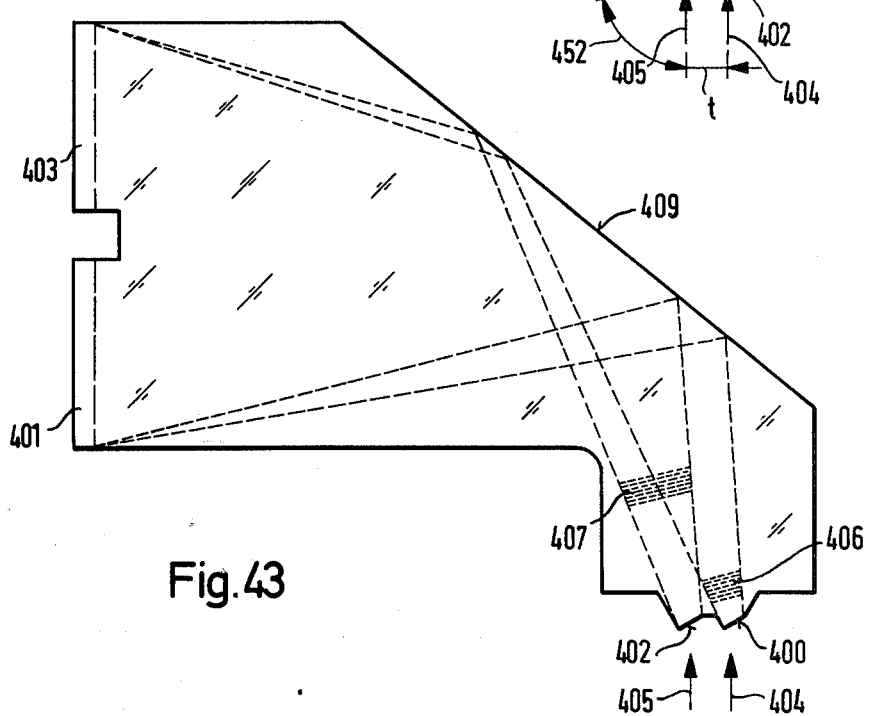

In FIGS. 41 and 42, it will be necessary to illuminate both light inlets in order to display the complete number "1". Depending upon the selected code, it may be desirable to have the "1" displayed with but the one or the other light inlet illuminated. A plate element provided for this case is shown in FIG. 43 in plan view, the indicated beams permitting readily to comprehend the effect: In this embodiment, both light inlets are inclined and the beam sections almost completely overlap within the plate element.

A display screen design alternative to the embodiment of FIG. 38 is shown in FIG. 45. The brick-shaped light guide blocks 150 are integrally formed at the underside of mask 372, and the upper side of the mask opposite to the blocks and aligned therewith depressions 410 are provided whose base 411 may be roughened. This results in a lateral stray of the light flux so that the display may be recognized laterally, too, and not only directly from above. These depressions or indentations facilitate further the application of coating 374 by means of silk screen printing or the like in order to increase the contrast.

The light transfer from plate elements 104 into light guide blocks 150 may occur through air provided the optical quality of the faces, in particular of the reflecting face 108 be sufficiently good, and in this case a curvature 412 adjacent the block segment ends will provide for a sharp illumination of the segment ends, too.

In FIG. 45 it is indicated that the plate elements 104 are spaced from each other a small distance. This avoids optical coupling therebetween due to moisture creeping into the interfaces.

In order to have parallel light flux even under limited space conditions for the light source, it may be advantageous to make use of plastic-optical lens elements which may be manufactured cheaply. FIGS. 46 and 47 illustrate such a design having an exactly parallel light flux and high light yield. A conventional low-voltage micro lamp 300 with integrated lense 302 (See FIG. 26) generates a light cone 415 having a cone angle 416. In front thereof, compound lens 417 is disposed. Its spheric-concave surface 418 facing the lamp diverges the light cone 415 commensurate with the height "h" of the plate element pile so that the angle 416 is increased to angle 420. The latter results from pile height h and distance d given by the design and permitting ready calculation of the curvature radius of sphere 418.

The surface 422 of the lens 417 opposite the lamp is cylindrical and compresses the light cone 415 in a plane perpendicular to that of angle 420 such that the cone angle 416 is reduced to angle 423 suited to completely illuminate the plate element light inlets staggered by distance "t", the curvature ratios of cylindrical surface 422 again being determined by t and d.

The light then passes through second lens 419. Its surface 421 facing the light source converts the diverging light beam impinging with angle 420 into a parallel beam 425 directed perpendicularly to the light inlet surface 310 of the display system.

Facing the plate elements, lens 419 has two parallel cylindrical surfaces 426 and 427 spaced by t from each other. They convert the parallel beam 425 into horizontally converging but vertically parallel beams 428, 429. Advantageously, the curvature radius of cylinder surfaces 426 and 427 is selected such that their focal lines are within the inlet plane 310.

Between lens 419 and inlet plane 310 there is the mask 218 illustrated in FIG. 19. The code strip between mask and plate light inlets is not illustrated however in FIGS. 46 and 47.

Both the lenses 417 and 419 are injection molded of transparent plastic material, lens 417 preferably being colored to increase contrast.

In order to completely employ the light at the light inlets of the plate elements, the cylindrical surfaces 426 and 427 may be replaced by a number of spherical-convex surfaces commensurate with the number of plate elements. FIGS. 48 and 49 illustrate this embodiment with the said lens portions 430. With a suitable curvature, these spheres may be made such that the diverging light beam 424 redirected parallel to each other by the lens surface 421 is converted and these parallel light beams are and split into nineteen light cones 431 by the lens surfaces 430, thereby converging toward the light inlets.

A somewhat increased power may be fed to low voltage lamps 433 having an olive shaped bulb and available under the trade mark "Prefocus". If such a lamp serves as light source, it is recommended to make the spherical surface 435 of the compound lens 440 convex instead of concave, as shown in FIGS. 50 and 51. The front tip of the bulb 434 may extend into a depression 436 provided in the apex of spherical surface 435.

In contrast to the design with lamp 300, sphere 435 must reduce the aperture angle 437 of light cone 438 to angle 439. Cylindrical surface 422 has the same purpose as described above for the embodiment of FIGS. 46, 47.

The alternative shapes of compound lenses 432 and 440 may be injection molded as well.

It is not compulsory to manufacture the spherical, or substantially spherical and/or cylindrical portions of such lens in an integral manner. An expert in plastic art will realize that the lens may be combined of separate parts for which, as the case may be, different typies of material may be used each having other diffraction angles.

I claim:

1. An optical display for presenting at a display field at least one digit in a seven segment arrangement, comprising
    a light source,
    seven transparent substantially planar plate elements for each digit arranged in a stack, each plate element having a light inlet at one of its edges, the light inlets of all seven plate elements being adjacent each other and confronting the light source to be irradiated by said light source,
    a coded shutter element having transparent and opaque areas being disposed between said light source and said plate element light inlets, said shutter element being incrementally movable across the light source and the light inlets of said plate elements to permit and prevent, respectively, light passage from said light source into said plate elements,
    said plate elements having means causing the light injected into the light inlet of a plate element to propagate in the plate element substantially parallel to the plane of said plate element,
    each plate element having a chamfered edge portion remote from said light inlet of said plate element, said chamfered edge portion having a prism surface oriented oblique to the plane of the plate element and totally reflecting light impinging thereon out of said plane of said plate element in a direction transversely thereof to present one segment of the digit, the display field comprising a plane substantially parallel to the plate elements, said chamfered edge portions of each of the seven stacked plate elements corresponding to one of the seven segments forming a digit, whereby substantially all of the light injected into the light inlet of a plate element will illuminate the respective segment.

2. The display according to claim 1, wherein the prism surface is inclined with respect to the plate plane by about 45°.

3. The display as claimed in claim 2, wherein the prism surface is defined at an incision at the light outlet side of the plate.

4. The display as claimed in claim 1, wherein each of the plate elements is elongate, the prism surface being disposed adjacent one end of the elongate plate element and the light inlet being disposed at the other end of the plate element.

5. The display as claimed in claim 1, wherein the prism surface is roughened.

6. The display as claimed in claim 1, wherein at least several plates of the display are provided with plate shaped light guiding blocks extending orthogonally to the plate plane and being disposed adjacent the light inlet, the plate element having a chamfered edge portion at said light inlet reflecting light impinging thereon from the light guiding block and into the plate element.

7. The display as claimed in claim 1, wherein at least several plates of the display are provided with plate shaped light guiding blocks extending orthogonally to the plate plane and being disposed adjacent the chamfered edge portion to receive light reflected from the prism surface.

8. The display as claimed in claim 7, wherein all of the light guiding blocks have the light outlets disposed in a common plane.

9. The display as claimed in claim 1, wherein each of the plates has an elongate inlet portion tapering convergently toward the light inlet.

10. The display as claimed in claim 9, wherein the light inlet includes a smoothly rounded concavely shaped edge surface of the plate.

11. The display as claimed in claim 1, wherein the plates have light reflecting edges extending approximately at 45° to the light propagation direction.

12. The display as claimed in claim 1, wherein one of the plate elements has a second chamfered edge portion adjacent the first mentioned chamfered edge portion, said second chamfered edge portion also being remote from the light inlet of the plate element and having a prism surface oriented oblique to the plane of the plate element and totally reflecting light impinging thereon out of the plane of the plate element in a direction transversely thereof to present a segment of the digit, the light inlet of said one plate element directing light to both of the chamfered edge portions.

13. The display as claimed in claim 12, wherein said one plate element has means producing beams of light from the light inlet to the separate chamfered edge portions.

14. The display as claimed in claim 12, wherein one of the chamfered edge portions directs an illuminated indicia to the display field and outside of the seven segment arrangement.

15. The display as claimed in claim 1 wherein the plate elements have light outlets adjacent the chamfered edge portions and including integral parallel cylinder lens portions.

16. The display as claimed in claim 1 wherein the plate elements have light outlets adjacent the chamfered edge portions and being provided with a fluorescent coating.

17. The display as claimed in claim 1 wherein the plate elements have light outlets adjacent the chamfered edge portions and provided with a phosphorescent coating.

18. The display as claimed in claim 1, wherein the light inlets of all plates being disposed in a surface substantially parallel to the direction of movement of said shutter element.

19. The display as claimed in claim 18, wherein the shutter element has alternating transparent and opaque code areas.

20. The display as claimed in claim 19, wherein the shutter element is mounted in confronting relation with the light inlets of the plate elements, and the shutter element having the transparent and opaque code areas arranged in sequenced code strips extending perpendicular to the movement direction of the shutter element, each code strip corresponding to a respective of the display.

21. The display as claimed in claim 20, wherein the shutter element is provided with transparent openings of substantially the same size as the light inlets of the plate elements.

22. The display as claimed in claim 18, wherein the light inlets of all plates have the same size.

23. The display as claimed in claim 22, wherein the light inlets of at least a portion of the plates is disposed in superposed configuration relative to each other and along a line extending perpendicularly to the direction of movement of the shutter element.

24. The display as claimed in claim 23, wherein the light inlets of all plates are arranged in superposed relation to each other.

25. The display as claimed in claim 23, wherein the light inlets of the plates are in two elongated parallel groups oriented perpendicular to the movement direction of the shutter element.

26. The display as claimed in claim 25, wherein the light inlets of the plate elements are fixed in a mounting plate.

27. The display as claimed in claim 26, wherein the light inlets of the plate elements are positively locked in said mounting plate.

28. The display as claimed in claim 25, wherein the light source includes a light guiding transmitter having diverting light outlets, each directing light into one of the groups of light inlets of the plate elements.

29. The display as claimed in claim 28, wherein the transmitter has means propagating light in a predetermined direction and has reflecting edges and reflecting surfaces extending substantially at 45° to the light propagation direction in the transmitter.

30. The display as claimed in claim 29, and a stationary mask between the light outlets of the transmitter and the shutter element.

31. The display as claimed in claim 18, wherein the light source has but one common light bulb.

32. The display as claimed in claim 31, wherein the light source comprises an electric light bulb and a light transducer which collects the light and directs it through the transparent area onto the light inlets of the light guiding plate elements.

33. The display as claimed in claim 32, wherein the light transmitter is an integral plastic member having substantially total reflective outer surfaces.

34. The display as claimed in claim 33, wherein the transmitter has a light outlet with at least one integral cylinder lens.

35. The display as claimed in claim 32, wherein the bulb has point surface characteristics and that the liquid guiding transmitter comprises first and second plastic-opical light guiding transmitters respectively being designed to focus light relative to a first plane and the second being designed to focus light relative to a second plane perpendicular to said first plane.

36. The display as claimed in claim 35, wherein said first transmitter is designed to produce divergence of the light in relation to said second plane.

37. The display as claimed in claim 37, wherein said second transmitter directs light parallel with respect to said second plane and is focusing relative to said first plane, also.

38. The display as claimed in claim 36, wherein said second transmitter produces convergent focusing relative to both planes.

39. The display as claimed in claim 26, wherein the plate elements, the mounting plate and the light guiding transmitters form a first common subassembly relatively adjustable with respect to the shutter element.

40. The display as claimed in claim 39 wherein the light source comprising the light bulb and a power source therefor form a second common subassembly.

41. The display as claimed in claim 36, wherein the first and the second subassemblies are mounted in a common housing with the movable shutter element and the second assembly is releasable from the housing.

42. The display as claimed in claim 41, wherein a housing is provided over the plate elements and includes a transparent sight plate defining the display field.

43. The display as claimed in claim 41, wherein a contrast mask is adjacent the plate elements adjacent the display field, said contrast mask being transparent only in the areas of the segments to be displayed.

44. The display as claimed in claim 1 wherein the plate elements have at least several outer surfaces with reflective coatings thereon.

45. The display as claimed in claim 1 wherein the plate elements have sides immediately adjacent each other which are optically isolated relative to each other.

46. Th display as claimed in claim 28, wherein the light guiding transmitter is comprised of several individual light transmitting pieces adjoining each other and optically isolated from each other and each respectively directing light into one of the groups of light inlets.

47. The display as claimed in claim 41 wherein the plate elements are combined into a block with adjacent sides joined together with an optically isolating glue.

48. The display as claimed in claim 1, and including means producing a colored light effect at the display field.

49. The display as claimed in claim 1 and a transparent mask at the display field and including positioning indentations complementary to the segments of the digit.

50. The display as claimed in claim 1, and the display field including an integral light coupler element disposed above the plate elements, said coupler element comprising a substantially planar sight screen at the display field and parallel to said plate elements and having, on its upper side, depressions in alignment with the chamfered edge portions of the plate elements and having on its underside substantially brick-shaped light guide blocks with edges confronting the chamfered edge portions of the plate elements and receiving light therefrom.

51. The display as claimed in claim 50, wherein the edges of said brick-shaped light guide blocks are rounded.

52. The display as claimed in claim 1 wherein a second segment is to be displayed by means of one single plate element, wherein said plate element has a second light inlet for the second segment, and also has means maintaining the light beams within the place element and from the two inlets in separate and distinct relation with respect to each other, the plate element also having a second chamfered edge portion also defining a second prism surface and totally reflecting light from the second inlet out of the plane of the plate element and to the display field.

53. The display as claimed in claim 52, wherein at least one light inlet is disposed with its main plane at an angle different from 90° with respect to the beam axis of the light impinging thereon.

54. The display as claimed in claim 1 wherein more than one segment is to be displayed by means of one single plate element, and wherein the plate element has a second light inlet, each inlet arranged to direct light to all segments, the plate element having a second chamfered edge portion also defining a second prism surface and totally reflecting light from both inlets out of the plane of the plate element and to the display field.

55. An optical display for presenting at a display field at least one digit in a seven segment arrangement, comprising:
a light source;
seven elongate transparent plate elements for each digit and arranged in a stack, each elongate plate element having an inlet end portion and an outlet end portion remote from said inlet end portion, the inlet end portion of each of the elongate plate elements tapering convergently toward a light inlet, the light inlets of all seven plate elements being adjacent each other and confronting the light source to be irradiated by said light source,
a coded shutter element having transparent and opaque areas and being disposed between said light source and the plate element light inlets, the shutter element being incrementally movable across the light source, and the light inlets of said plate elements to permit and prevent, respectively, light passage from said light source into the plate elements,
the light source and plate elements having cooperating means causing the light injected into the light inlet of a plate element to propagate in the plate element substantially parallel to the plane of the plate element,
the outlet end portion of each of the plate elements having a chamfered edge portion defining an elongate prism surface facing obliquely downwardly relative to the plane of the plate element and totally reflecting light impinging thereon upwardly and out of the plane of the plate element in the direction of the display field to emit a bar-shaped segment upwardly to the display field,
a first group of the elongate plate elements in the stack having the elongate prism surfaces extending transversely of the elongate plate elements,
a second group of the elongate plate elements having the elongate prism surfaces extending longitudinally of the elongate plate elements and transversely of the elongate prism surfaces of the first group of plate elements, and the second group of elongate plate elements having obliquely extending reflecting edges directing propagated light to the longitudinally extending prism surfaces,
the plate elements being of varying lengths in the stack with the longest and shortest plate elements being respectively disposed at the bottom and top of the stack and the remaining plate elements progressively varying in length from the bottom to the top of the stack, and each of the elongate prism surfaces being oriented to correspond to one of the seven segments forming a display, the display field comprising a plane substantially parallel to the plate element.

* * * * *